(12) United States Patent
Watson et al.

(10) Patent No.: US 8,793,021 B2
(45) Date of Patent: Jul. 29, 2014

(54) ENERGY MANAGEMENT OF HOUSEHOLD APPLIANCES

(75) Inventors: Eric K. Watson, Crestwood, KY (US);
John K. Besore, Prospect, KY (US);
Brice Alan Bowley, Goshen, KY (US);
Jeff Donald Drake, Louisville, KY (US); Michael F. Finch, Louisville, KY (US); John Joseph Roetker, Louisville, KY (US); Steven Keith Root, Buckner, KY (US); Gregory M. Thomas, Shepherdsville, KY (US); Natarajan Venkatakrishnan, Louisville, KY (US)

(73) Assignee: General Electric Company, Schenectady, NY (US)

( * ) Notice: Subject to any disclaimer, the term of this patent is extended or adjusted under 35 U.S.C. 154(b) by 1289 days.

(21) Appl. No.: 12/559,539

(22) Filed: Sep. 15, 2009

(65) Prior Publication Data
US 2010/0070091 A1    Mar. 18, 2010

Related U.S. Application Data

(60) Provisional application No. 61/097,082, filed on Sep. 15, 2008.

(51) Int. Cl.
G01M 1/38    (2006.01)

(52) U.S. Cl.
USPC ........................................................ 700/276

(58) Field of Classification Search
CPC ........ F24F 1/00; G05D 11/0012; G05B 15/02
USPC ............. 700/17, 36, 276, 291, 296, 299, 300
See application file for complete search history.

(56) References Cited

U.S. PATENT DOCUMENTS 2,545,054 A    3/1951    Stitz
3,683,343 A    8/1972    Feldman et al.
(Continued)

FOREIGN PATENT DOCUMENTS

CN    1692317 A    11/2005
CN    101013979 A    8/2007
(Continued)

OTHER PUBLICATIONS

Search Report from CN Application No. 201010135268.8 dated Oct. 24, 2012.

(Continued)

Primary Examiner — Sean Shechtman
Assistant Examiner — Chad Rapp
(74) Attorney, Agent, or Firm — Global Patent Operation; Marc A. Vivenzio

(57) ABSTRACT

An appliance for conditioning air of a room comprises one or more power consuming features/functions including a temperature controlling element for one of heating and cooling air. A controller is operatively connected to the one or more power consuming features/functions. The controller is configured to receive and process a signal indicative of a utility state. The controller operates the appliance in one of a plurality of operating modes, including at least a normal operating mode and an energy savings mode in response to the received signal. The controller is configured to at least one of selectively adjust and deactivate at least one of the one or more power consuming features/functions to reduce power consumption of the appliance in the energy savings mode.

6 Claims, 24 Drawing Sheets

(56) References Cited

U.S. PATENT DOCUMENTS

| | | | |
|---|---|---|---|
| 3,720,073 A * | 3/1973 | McCarty | 62/183 |
| 4,048,812 A | 9/1977 | Thomason | |
| 4,167,786 A | 9/1979 | Miller et al. | |
| 4,190,756 A | 2/1980 | Foerstner | |
| 4,216,658 A | 8/1980 | Baker et al. | |
| 4,247,786 A | 1/1981 | Hedges | |
| 4,362,970 A | 12/1982 | Grady | |
| 4,454,509 A | 6/1984 | Buennagel et al. | |
| 4,637,219 A | 1/1987 | Grose | |
| 4,659,943 A | 4/1987 | Virant | |
| 4,718,403 A | 1/1988 | McCall | |
| 4,731,547 A | 3/1988 | Alenduff et al. | |
| 4,841,281 A | 6/1989 | Melvin, Jr. | |
| 4,903,502 A | 2/1990 | Hanson et al. | |
| 4,926,837 A | 5/1990 | Parker et al. | |
| 4,998,024 A | 3/1991 | Kirk et al. | |
| 5,040,724 A | 8/1991 | Brinkruff et al. | |
| 5,137,041 A | 8/1992 | Hall et al. | |
| 5,183,998 A | 2/1993 | Hoffman et al. | |
| 5,220,807 A | 6/1993 | Bourne et al. | |
| 5,224,355 A | 7/1993 | So et al. | |
| 5,230,467 A | 7/1993 | Kubsch et al. | |
| 5,289,362 A | 2/1994 | Liebl et al. | |
| 5,408,578 A | 4/1995 | Bolivar | |
| 5,430,430 A | 7/1995 | Gilbert | |
| 5,451,843 A | 9/1995 | Kahn et al. | |
| 5,462,225 A | 10/1995 | Massara et al. | |
| 5,479,157 A | 12/1995 | Suman et al. | |
| 5,479,558 A | 12/1995 | White et al. | |
| 5,481,140 A | 1/1996 | Maruyama et al. | |
| 5,488,565 A | 1/1996 | Kennon et al. | |
| 5,495,551 A | 2/1996 | Robinson et al. | |
| 5,504,306 A | 4/1996 | Russell et al. | |
| 5,505,377 A | 4/1996 | Weiss | |
| 5,515,692 A | 5/1996 | Sterber et al. | |
| 5,574,979 A | 11/1996 | West | |
| 5,581,132 A | 12/1996 | Chadwick | |
| 5,635,895 A | 6/1997 | Murr | |
| 5,706,191 A | 1/1998 | Bassett et al. | |
| 5,761,083 A | 6/1998 | Brown et al. | |
| 5,805,856 A | 9/1998 | Hanson | |
| 5,816,491 A | 10/1998 | Berkeley et al. | |
| 5,866,880 A | 2/1999 | Seitz et al. | |
| 5,874,902 A | 2/1999 | Heinrich et al. | |
| 5,880,536 A | 3/1999 | Mardirossian | |
| 5,883,802 A | 3/1999 | Harris | |
| 5,886,647 A | 3/1999 | Badger et al. | |
| 5,926,776 A | 7/1999 | Glorioso et al. | |
| 5,937,942 A | 8/1999 | Bias et al. | |
| 5,956,462 A | 9/1999 | Langford | |
| 6,018,150 A | 1/2000 | Maher, Jr. | |
| 6,026,651 A | 2/2000 | Sandelman | |
| 6,080,971 A | 6/2000 | Seitz | |
| 6,118,099 A | 9/2000 | Lake | |
| 6,144,161 A * | 11/2000 | Kimmich et al. | 315/159 |
| 6,179,213 B1 | 1/2001 | Gibino et al. | |
| 6,185,483 B1 | 2/2001 | Drees | |
| 6,229,433 B1 | 5/2001 | Rye et al. | |
| 6,246,831 B1 | 6/2001 | Seitz et al. | |
| 6,380,866 B1 | 4/2002 | Sizer et al. | |
| 6,400,103 B1 | 6/2002 | Adamson | |
| 6,480,753 B1 | 11/2002 | Calder et al. | |
| 6,489,597 B1 | 12/2002 | Hornung | |
| 6,553,595 B1 | 4/2003 | Bruntz et al. | |
| 6,631,622 B1 | 10/2003 | Ghent et al. | |
| 6,694,753 B1 | 2/2004 | Lanz et al. | |
| 6,694,927 B1 | 2/2004 | Pouchak et al. | |
| 6,704,401 B2 | 3/2004 | Piepho et al. | |
| 6,778,868 B2 | 8/2004 | Imamura et al. | |
| 6,784,872 B1 | 8/2004 | Matsui et al. | |
| 6,806,446 B1 | 10/2004 | Neale | |
| 6,817,195 B2 | 11/2004 | Rafalovich et al. | |
| 6,828,695 B1 | 12/2004 | Hansen | |
| 6,860,431 B2 * | 3/2005 | Jayadev | 236/47 |
| 6,872,919 B2 | 3/2005 | Wakefield et al. | |
| 6,873,876 B1 | 3/2005 | Aisa | |
| 6,879,059 B2 | 4/2005 | Sleva | |
| 6,904,385 B1 | 6/2005 | Budike | |
| 6,922,598 B2 | 7/2005 | Lim et al. | |
| 6,943,321 B2 | 9/2005 | Carbone et al. | |
| 6,961,642 B2 | 11/2005 | Horst | |
| 6,983,210 B2 | 1/2006 | Matsubayashi et al. | |
| 7,010,363 B2 * | 3/2006 | Donnelly et al. | 700/19 |
| 7,039,575 B2 | 5/2006 | Juneau | |
| 7,043,380 B2 | 5/2006 | Rodenberg et al. | |
| 7,053,790 B2 | 5/2006 | Jang et al. | |
| 7,057,140 B2 | 6/2006 | Pittman | |
| 7,069,090 B2 | 6/2006 | Huffington et al. | |
| 7,082,380 B2 | 7/2006 | Wiebe et al. | |
| 7,110,832 B2 | 9/2006 | Ghent | |
| 7,155,305 B2 | 12/2006 | Hayes et al. | |
| 7,164,851 B2 | 1/2007 | Sturm et al. | |
| 7,206,670 B2 | 4/2007 | Pimputkar et al. | |
| 7,266,962 B2 | 9/2007 | Montuoro et al. | |
| 7,274,973 B2 | 9/2007 | Nichols et al. | |
| 7,274,975 B2 | 9/2007 | Miller et al. | |
| 7,368,686 B2 | 5/2008 | Etheredge et al. | |
| 7,372,002 B2 | 5/2008 | Nakamura et al. | |
| 7,420,140 B2 | 9/2008 | Lenhart et al. | |
| 7,420,293 B2 | 9/2008 | Donnelly et al. | |
| 7,446,646 B2 | 11/2008 | Huomo | |
| 7,478,070 B2 | 1/2009 | Fukui et al. | |
| 7,541,941 B2 | 6/2009 | Bogolea et al. | |
| 7,561,977 B2 | 7/2009 | Horst et al. | |
| 7,565,813 B2 | 7/2009 | Pouchak | |
| 7,685,849 B2 | 3/2010 | Worthington | |
| 7,720,035 B2 | 5/2010 | Oh et al. | |
| 7,751,339 B2 | 7/2010 | Melton et al. | |
| 7,783,390 B2 | 8/2010 | Miller | |
| 7,919,729 B2 | 4/2011 | Hsu | |
| 7,925,388 B2 | 4/2011 | Ying | |
| 7,962,248 B2 | 6/2011 | Flohr | |
| 7,991,513 B2 | 8/2011 | Pitt | |
| 8,024,073 B2 | 9/2011 | Imes et al. | |
| 8,027,752 B2 | 9/2011 | Castaldo et al. | |
| 8,033,686 B2 | 10/2011 | Recker et al. | |
| 8,094,037 B2 | 1/2012 | Unger | |
| 8,185,252 B2 | 5/2012 | Besore | |
| 8,190,302 B2 | 5/2012 | Burt et al. | |
| 8,355,748 B2 | 1/2013 | Abe et al. | |
| 8,367,984 B2 | 2/2013 | Besore et al. | |
| 2001/0025349 A1 | 9/2001 | Sharood et al. | |
| 2001/0048361 A1 | 12/2001 | Mays et al. | |
| 2002/0024332 A1 | 2/2002 | Gardner | |
| 2002/0071689 A1 | 6/2002 | Miyamoto | |
| 2002/0125246 A1 | 9/2002 | Cho et al. | |
| 2002/0175806 A1 | 11/2002 | Marneweck et al. | |
| 2002/0196124 A1 | 12/2002 | Howard et al. | |
| 2002/0198629 A1 | 12/2002 | Ellis | |
| 2003/0036820 A1 | 2/2003 | Yellepeddy et al. | |
| 2003/0043845 A1 | 3/2003 | Lim et al. | |
| 2003/0178894 A1 | 9/2003 | Ghent | |
| 2003/0193405 A1 | 10/2003 | Hunt et al. | |
| 2003/0194979 A1 | 10/2003 | Richards et al. | |
| 2003/0233201 A1 | 12/2003 | Horst et al. | |
| 2004/0024483 A1 | 2/2004 | Holcombe | |
| 2004/0034484 A1 | 2/2004 | Solomita et al. | |
| 2004/0098171 A1 | 5/2004 | Horst | |
| 2004/0100199 A1 | 5/2004 | Yang | |
| 2004/0107510 A1 | 6/2004 | Buckroyd et al. | |
| 2004/0112070 A1 | 6/2004 | Schanin | |
| 2004/0117330 A1 | 6/2004 | Ehlers et al. | |
| 2004/0118008 A1 | 6/2004 | Jeong et al. | |
| 2004/0128266 A1 | 7/2004 | Yellepeddy et al. | |
| 2004/0133314 A1 | 7/2004 | Ehlers et al. | |
| 2004/0139038 A1 | 7/2004 | Ehlers et al. | |
| 2004/0254654 A1 | 12/2004 | Donnelly et al. | |
| 2005/0011205 A1 | 1/2005 | Holmes et al. | |
| 2005/0134469 A1 | 6/2005 | Odorcic et al. | |
| 2005/0138929 A1 | 6/2005 | Enis et al. | |
| 2005/0173401 A1 | 8/2005 | Bakanowski et al. | |
| 2005/0184046 A1 | 8/2005 | Sterling | |
| 2005/0190074 A1 | 9/2005 | Cumeralto et al. | |
| 2006/0031180 A1 | 2/2006 | Tamarkin et al. | |

(56) References Cited

U.S. PATENT DOCUMENTS

| | | |
|---|---|---|
| 2006/0036338 A1 | 2/2006 | Harkcom et al. |
| 2006/0068728 A1 | 3/2006 | Ishidoshiro et al. |
| 2006/0095164 A1 | 5/2006 | Donnelly et al. |
| 2006/0123807 A1 | 6/2006 | Sullivan et al. |
| 2006/0159043 A1 | 7/2006 | Delp et al. |
| 2006/0162973 A1 | 7/2006 | Harris et al. |
| 2006/0190139 A1 | 8/2006 | Reaume et al. |
| 2006/0208570 A1 | 9/2006 | Christian et al. |
| 2006/0259547 A1 | 11/2006 | Bogatin et al. |
| 2006/0272830 A1 | 12/2006 | Fima et al. |
| 2006/0276938 A1 | 12/2006 | Miller |
| 2006/0289436 A1 | 12/2006 | Carbone et al. |
| 2007/0005195 A1 | 1/2007 | Pasquale et al. |
| 2007/0008076 A1 | 1/2007 | Rodgers et al. |
| 2007/0030116 A1 | 2/2007 | Feher |
| 2007/0043478 A1 | 2/2007 | Ehlers et al. |
| 2007/0136217 A1 | 6/2007 | Johnson et al. |
| 2007/0151311 A1 | 7/2007 | McAllister et al. |
| 2007/0185675 A1 | 8/2007 | Papamichael et al. |
| 2007/0203860 A1 | 8/2007 | Golden et al. |
| 2007/0213880 A1 | 9/2007 | Ehlers |
| 2007/0220907 A1 | 9/2007 | Ehlers |
| 2007/0229236 A1 | 10/2007 | Mercer et al. |
| 2007/0271006 A1 | 11/2007 | Golden et al. |
| 2007/0276547 A1 | 11/2007 | Miller |
| 2008/0029081 A1 | 2/2008 | Gagas et al. |
| 2008/0034768 A1 | 2/2008 | Pimentel et al. |
| 2008/0083729 A1 | 4/2008 | Etheredge et al. |
| 2008/0106147 A1 | 5/2008 | Caggiano et al. |
| 2008/0120790 A1 | 5/2008 | Ashrafzadeh et al. |
| 2008/0122585 A1 | 5/2008 | Castaldo et al. |
| 2008/0136581 A1 | 6/2008 | Heilman et al. |
| 2008/0144550 A1 | 6/2008 | Makhlouf et al. |
| 2008/0167756 A1 | 7/2008 | Golden et al. |
| 2008/0167931 A1 | 7/2008 | Gerstemeier et al. |
| 2008/0172312 A1 | 7/2008 | Synesiou et al. |
| 2008/0177678 A1 | 7/2008 | Di Martini et al. |
| 2008/0179052 A1* | 7/2008 | Kates .................. 165/208 |
| 2008/0204240 A1 | 8/2008 | Hilgers et al. |
| 2008/0215263 A1 | 9/2008 | Flohr |
| 2008/0258633 A1 | 10/2008 | Voysey |
| 2008/0272934 A1 | 11/2008 | Wang et al. |
| 2008/0277487 A1* | 11/2008 | Mueller et al. ............ 236/46 A |
| 2009/0006878 A1 | 1/2009 | Borghetti et al. |
| 2009/0038369 A1 | 2/2009 | Vondras |
| 2009/0063257 A1 | 3/2009 | Zak et al. |
| 2009/0105888 A1 | 4/2009 | Flohr et al. |
| 2009/0146838 A1 | 6/2009 | Katz |
| 2009/0171862 A1* | 7/2009 | Harrod et al. ................ 705/412 |
| 2009/0235675 A1 | 9/2009 | Chang et al. |
| 2009/0240381 A1 | 9/2009 | Lane |
| 2009/0254396 A1 | 10/2009 | Metcalfe |
| 2009/0326728 A1 | 12/2009 | Chrisop et al. |
| 2010/0017242 A1 | 1/2010 | Hamilton et al. |
| 2010/0070091 A1 | 3/2010 | Watson et al. |
| 2010/0092625 A1 | 4/2010 | Finch et al. |
| 2010/0131117 A1 | 5/2010 | Mattiocco et al. |
| 2010/0175719 A1 | 7/2010 | Finch et al. |
| 2010/0179708 A1 | 7/2010 | Watson et al. |
| 2010/0262963 A1 | 10/2010 | Wassermann et al. |
| 2010/0301774 A1 | 12/2010 | Chemel et al. |
| 2011/0001438 A1 | 1/2011 | Chemel et al. |
| 2011/0062142 A1 | 3/2011 | Steurer |
| 2011/0085287 A1 | 4/2011 | Ebrom et al. |
| 2011/0087382 A1 | 4/2011 | Santacatterina et al. |
| 2011/0095017 A1 | 4/2011 | Steurer |
| 2011/0106328 A1 | 5/2011 | Zhou et al. |
| 2011/0114627 A1 | 5/2011 | Burt |
| 2011/0123179 A1 | 5/2011 | Roetker et al. |
| 2011/0148390 A1 | 6/2011 | Burt et al. |
| 2011/0153106 A1 | 6/2011 | Drake et al. |
| 2011/0181114 A1 | 7/2011 | Hodges et al. |
| 2011/0290781 A1 | 12/2011 | Burt et al. |
| 2012/0054123 A1 | 3/2012 | Broniak et al. |

FOREIGN PATENT DOCUMENTS

| | | |
|---|---|---|
| EP | 1496324 A1 | 1/2005 |
| GB | 2105127 A | 3/1983 |
| JP | 11313441 A2 | 11/1999 |
| KR | 20060085711 A | 7/2006 |
| WO | 86/00976 A1 | 2/1986 |
| WO | 90/12261 A1 | 10/1990 |
| WO | 98/48335 A1 | 10/1998 |
| WO | 2007/060059 A1 | 5/2007 |
| WO | 2007136456 A2 | 11/2007 |

OTHER PUBLICATIONS

International Search Report from PCT Application No. PCT/US2009/056878, Nov. 17, 2009.
International Search Report from PCT Application No. PCT/US2009/056882, Nov. 4, 2009.
International Search Report from PCT Application No. PCT/US2009/056883, Oct. 26, 2009.
International Search Report from PCT Application No. PCT/US2009/056886, Nov. 5, 2009.
International Search Report from PCT Application No. PCT/US2009/056889, Nov. 10, 2009.
International Search Report from PCT Application No. PCT/US2009/056894, Nov. 13, 2009.
International Search Report from PCT Application No. PCT/US2009/056895, Nov. 9, 2009.
International Search Report from PCT Application No. PCT/US2009/056901, Nov. 10, 2009.
International Search Report from PCT Application No. PCT/US2009/056906, Nov. 10, 2009.
International Search Report from PCT Application No. PCT/US2009/056913, Nov. 10, 2009.
International Search Report from PCT Application No. PCT/US2009/056914, Nov. 2, 2009.
International Search Report from PCT Application No. PCT/US2009/056919, Nov. 2, 2009.
Search Report from EP Application No. 10153695.1, May 24, 2012.
Lemay et al., An Integrated Architecture for Demand Response Communications and Control, University of Illinois Urbana-Champaign, Oct. 28, 2008.
Real-Time Feedback, Natural Resources Canada via website www.nrcan.gc.ca , 2008, http://oee.nrcan.gc.ca/publications/equipment/10918.
PCT Application No. PCT/US09/56911, Search Report, Mar. 10, 2010.

* cited by examiner

| | | | |
|---|---|---|---|
| REFRIGERATOR | REFR UI RESPONSE (DSM DISABLED) | DURING OPERATION | NORMAL DISPLAY |
| | REFR UI RESPONSE (DSM ENABLED) | DURING OPERATION | DISPLAY "ECO RATE LOW-NORMAL OPERATION" |
| WASHER | DRYER UI RESPONSE (DSM DISABLED) | PRIOR TO OPERATION | NORMAL DISPLAY |
| | DRYER UI RESPONSE (DSM DISABLED) | DURING OPERATION | NORMAL DISPLAY |
| | WASHER UI RESPONSE (DSM ENABLED) | PRIOR TO OPERATION | NORMAL DISPLAY |
| | WASHER UI RESPONSE (DSM ENABLED) | DURING OPERATION | NORMAL DISPLAY |
| DRYER | DRYER UI RESPONSE (DSM DISABLED) | PRIOR TO OPERATION | NORMAL DISPLAY |
| | DRYER UI RESPONSE (DSM DISABLED) | DURING OPERATION | NORMAL DISPLAY |
| | DRYER UI RESPONSE (DSM ENABLED) | PRIOR TO OPERATION | NORMAL DISPLAY |
| | DRYER UI RESPONSE (DSM ENABLED) | DURING OPERATION | NORMAL DISPLAY |
| RANGE | RANGE UI RESPONSE (DSM DISABLED OR NORMAL) | PRIOR TO OPERATION | NORMAL DISPLAY |
| | | DURING OPERATION | NORMAL DISPLAY |
| | RANGE UI RESPONSE (DSM ENABLED) | PRIOR TO OPERATION | NORMAL DISPLAY |
| | | DURING OPERATION | NORMAL DISPLAY |
| DISHWASHER | DISHWASHER UI RESPONSE (DSM DISABLED OR NORMAL) | PRIOR TO OPERATION | NORMAL DISPLAY |
| | | DURING OPERATION | NORMAL DISPLAY |
| | DISHWASHER UI RESPONSE (DSM ENABLED) | PRIOR TO OPERATION | NORMAL DISPLAY |
| | | DURING OPERATION | NORMAL DISPLAY |
| MWO | DISHWASHER UI RESPONSE (DSM DISABLED OR NORMAL) | PRIOR TO OPERATION | NORMAL DISPLAY |
| | | DURING OPERATION | NORMAL DISPLAY |
| | DISHWASHER UI RESPONSE (DSM ENABLED) | PRIOR TO OPERATION | NORMAL DISPLAY |
| | | DURING OPERATION | NORMAL DISPLAY |

MATCH TO FIG. 9B

Fig. 9A

| MEDIUM | HIGH | CRITICAL |
|---|---|---|
| NORMAL DISPLAY | NORMAL DISPLAY | NORMAL DISPLAY |
| DISPLAY "ECO RATE MEDIUM-NORMAL OPERATION" | DISPLAY "ECO RATE HIGH – FEATURES DELAYED" | DISPLAY "ECO RATE CRITICAL – FEATURES DELAYED" |
| NORMAL DISPLAY | NORMAL DISPLAY | NORMAL DISPLAY |
| NORMAL DISPLAY | NORMAL DISPLAY | NORMAL DISPLAY |
| NORMAL DISPLAY | DISPLAY "DELAY ECO" | DISPLAY "DELAY ECO" |
| NORMAL DISPLAY | DISPLAY "ECO" | DISPLAY "ECO" |
| NORMAL DISPLAY | NORMAL DISPLAY | NORMAL DISPLAY |
| NORMAL DISPLAY | NORMAL DISPLAY | NORMAL DISPLAY |
| NORMAL DISPLAY | DISPLAY "DELAY ECO" | DISPLAY "DELAY ECO" |
| NORMAL DISPLAY | DISPLAY "ECO" | DISPLAY "ECO" |
| NORMAL DISPLAY | NORMAL DISPLAY | NORMAL DISPLAY |
| NORMAL DISPLAY | NORMAL DISPLAY | NORMAL DISPLAY |
| NORMAL DISPLAY | DISPLAY "ECO" | DISPLAY "ECO" |
| NORMAL DISPLAY | DISPLAY "ECO" | DISPLAY "ECO" |
| NORMAL DISPLAY | NORMAL DISPLAY | NORMAL DISPLAY |
| NORMAL DISPLAY | NORMAL DISPLAY | NORMAL DISPLAY |
| DISPLAY "ECO" | DISPLAY "ECO" | DISPLAY "ECO" |
| DISPLAY "ECO" | DISPLAY "ECO" | DISPLAY "ECO" |
| NORMAL DISPLAY | NORMAL DISPLAY | NORMAL DISPLAY |
| NORMAL DISPLAY | NORMAL DISPLAY | NORMAL DISPLAY |
| NORMAL DISPLAY | DISPLAY "ECO" | DISPLAY "ECO" |
| NORMAL DISPLAY | DISPLAY "ECO" | DISPLAY "ECO" |

MATCH TO FIG. 9A

Fig. 9B

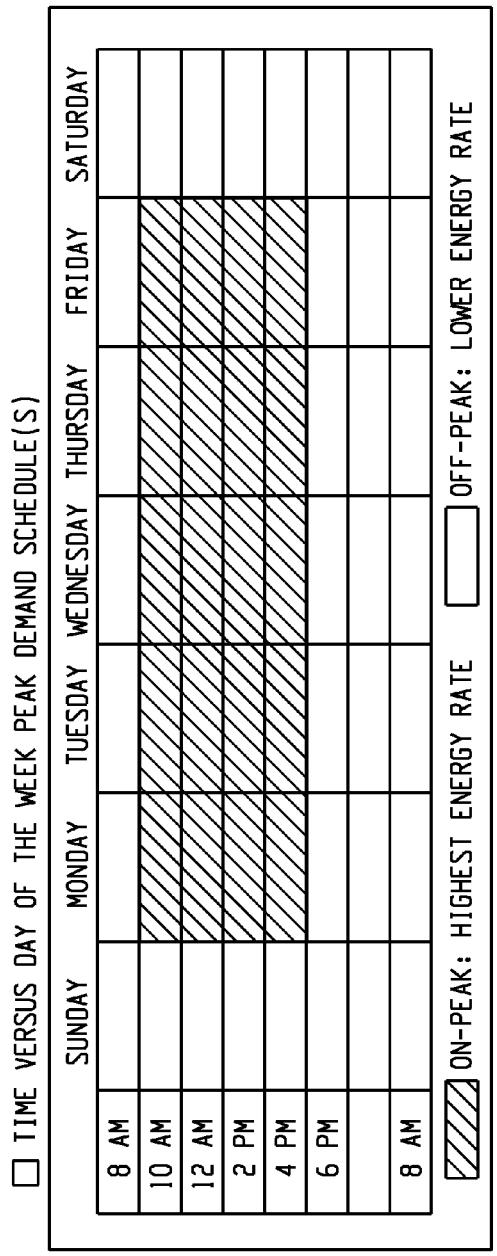

ELECTRIC POWER UTILITY - TIME OF USE - AS APPLIED TO REFRIGERATION

BACKGROUND

TIME-OF-USE IS A VOLUNTARY ELECTRIC UTILITY PROGRAM WHICH ALLOWS A CONSUMER TO PURCHASE LOWER PRICED ELECTRIC POWER BY USING POWER WHEN THE "GRID" ELECTRIC DEMAND IS LESS. THE TIME-OF-USE SCHEDULE IS GENERALLY WORKED OUT WITH THE REGIONAL POWER COMPANY AND LEGISLATORS AND THE SCHEDULE IS WELL KNOWN AND EASILY OBTAINED BY THE CONSUMER.

PARTS OF THE SYSTEM

SYSTEM IMPLEMENTATION HAS THREE UNIQUE CATEGORIES AND ARE LISTED BELOW:

(1) METHOD OF INPUTTING THE TIME-OF-USE SCHEDULE (A) CONSUMER ZIP CODE ENTRY - REQUIRES A DATABASE MANAGED BY GE AND UPGRADEABLE
    (B) TIME VERSUS DAY OF THE WEEK PEAK DEMAND SCHEDULE WITH USER INPUT - REQUIRES INITIAL INPUT BY CONSUMER AND DATABASE MANAGED BY USER WHEN CHANGES HAPPEN (2) ELECTRONIC CIRCUIT CHANGES REQUIRED - CIRCUITRY THAT KEEPS TIME WILL BE REQUIRED AND SOFTWARE TO INTERACT WITH THE TIME-OF-USE SCHEDULE INPUT AND ACTIONS WOULD BE REQUIRED (A) ONE METHOD WOULD BE A ZERO CROSS
    (B) ANOTHER METHOD WOULD BE A CLOCK CALENDAR IC WITH CAPACITOR OR BATTERY BACKUP (3) A LIST OF ACTIONS THAT COULD BE PERFORMED AT TIMES WHEN THE ELECTRIC RATES ARE OFF PEAK (A) DELAY DEFROST UNTIL OFF PEAK
    (B) PRECHILL WHEN NEARING PEAK DEMAND TO KEEP THE COMPRESSOR USAGE AT A MINIMUM DURING PEAK DEMAND
    (C) ALERT USER WHEN PEAK DEMAND IS ON WHEN THE DOORS ARE OPENED (LIGHT ELECTRIC DRAW) OR WHEN THE ICE DISPENSER IS USED DURING PEAK DEMAND

*Fig. 11*

A LIST OF ACTIONS THAT COULD BE PERFORMED AT TIMES WHEN THE ELECTRIC RATES ARE OFF PEAK

> DELAY DEFROST UNTIL OFF PEAK

> PRECHILL WHEN NEARING PEAK DEMAND TO KEEP THE COMPRESSOR USAGE AT A MINIMUM DURING PEAK DEMAND

> ALERT USER WHEN PEAK DEMAND IS ON - OCCURS WHEN THE DOOR WAS OPENED OR ICE CRUSHER USED, ETC.

*Fig. 20*

TITLE: APPLIANCE ACTIONS AND RESPONSE - DEMAND SIDE MANAGEMENT FOR HOME APPLIANCES
ABSTRACT: THE INVENTION(S) ARE THE APPLIANCE ACTIONS AND RESPONSES TO ELECTRIC UTILITY SIGNALS PROVIDED
IN CONJUNCTION WITH A DEMAND SIDE MANAGEMENT (DSM) SYSTEM. THIS IS PART OF THE ADVANCED METERING
INFRASTRUCTURE (AMI) INITIATIVE WHICH PROVIDES REMOTE METERING FUNCTIONS SUCH AS REMOTE METER READING,
DEMAND SIGNALING/LOAD CONTROL, ETC.. THE ATTACHED DOCUMENT DESCRIBES IN BRIEF DETAIL
ACTIONS AND RESPONSES TO DSM SIGNALING.

UPON RECEIVING A HIGH PRICE ENERGY SIGNAL THE USER MAY SET THE UNIT TO:

a) DELAY ALL SPECIAL MODES UNTIL THE LOW PRICED ENERGY SIGNAL IS RECEIVED. MODE EXAMPLES ARE:

i. ICE MAKER ii. BEVERAGE CENTER iii. TURBO COOL iv. CUSTOM COOL v. QUICK ICE b) OVERRIDE THE HIGH PRICED ENERGY SIGNAL, ALWAYS OR BASED ON A CERTAIN $/Kwh LEVEL c) DELAY DEFROST UNTIL PEFORMANCE IS WOULD BE AFFECTED d) ANNOUNCE OR AUDIBLE ALERT OF THE "HIGH PRICED ENERGY SIGNAL" DURING A CYCLE e) VISUALLY ALERT USER OF THE "HIGH PRICED ENERGY" SIGNAL f) DISPLAY THE COST OF RUNNING THE UNIT IN THE SELECTED MODE OF OPERATION g) DISPLAY THE COST OF ENERGY AT THE PRESENT TIME h) DISABLE LIGHTING i) TURN OFF SWEAT HEATERS

*Fig. 21*

ENERGY MANAGEMENT OF HOUSEHOLD APPLIANCES

CROSS REFERENCE TO RELATED APPLICATIONS

The present application claims priority from U.S. Provisional Patent Application Ser. No. 61/097,082 filed 15 Sep. 2008, now Ser. No. 12/559,703, filed 15 Sep. 2009; which provisional patent application is expressly incorporated herein by reference, in its entirety. In addition, cross-reference is made to commonly owned, copending application Ser. No. 12/559,636, filed 15 Sep. 2009; Ser. No. 12/559,539, filed 15 Sep. 2009; Ser. No. 12/559,654, filed 15 Sep. 2009; Ser. No. 12/559,581, filed 15 Sep. 2009; Ser. No. 12/559,550, filed 15 Sep. 2009; Ser. No. 12/559,597, filed 15 Sep. 2009; Ser. No. 12/559,705, filed 15 Sep. 2009; Ser. No. 12/559,561, filed 15 Sep. 2009; Ser. No. 12/559,577, filed 15 Sep. 2009; Ser. No. 12/559,751, filed 15 Sep. 2009; and Ser. No. 12/559,684, filed 15 Sep. 2009.

BACKGROUND

This disclosure relates to energy management, and more particularly to energy management of household consumer appliances. The disclosure finds particular application to changing existing appliances via add-on features or modules, and incorporating new energy saving features and functions into new appliances.

Currently utilities charge a flat rate, but with increasing cost of fuel prices and high energy usage at certain parts of the day, utilities have to buy more energy to supply customers during peak demand. Consequently, utilities are charging higher rates during peak demand. If peak demand can be lowered, then a potential huge cost savings can be achieved and the peak load that the utility has to accommodate is lessened.

One proposed third party solution is to provide a system where a controller "switches" the actual energy supply to the appliance or control unit on and off. However, there is no active control beyond the mere on/off switching. It is believed that others in the industry cease some operations in a refrigerator during on-peak time.

For example, in a refrigerator most energy is consumed to keep average freezer compartment temperature at a constant level. Recommended temperature level is based on bacteria multiplication. Normally recommended freezer temperature for long (1-2 month) food storage is 0 degrees F. Research shows that bacteria rise is a linear function of the compartment temperature, i.e., the lower the temperature the lower the bacteria multiplication. Refrigerator designers now use this knowledge to prechill a freezer compartment (and in less degree a refrigerator compartment also) before defrost, thus keeping an average temperature during time interval that includes before, during, and after defrost at approximately the same level (for example, 0 degrees F.).

There are also currently different methods used to determine when variable electricity-pricing schemes go into effect. There are phone lines, schedules, and wireless signals sent by the electrical company. One difficulty is that no peak shaving method for an appliance such as a refrigerator will provide a maximal benefit. Further, different electrical companies use different methods of communicating periods of high electrical demand to their consumers. Other electrical companies simply have rate schedules for different times of day.

Electrical utilities moving to an Advanced Metering Infrastructure (AMI) system will need to communicate to appliances, HVAC, water heaters, etc. in a home or office building. All electrical utility companies (more than 3,000 in the US) will not be using the same communication method to signal in the AMI system. Similarly, known systems do not communicate directly with the appliance using a variety of communication methods and protocols, nor is a modular and standard method created for communication devices to interface and to communicate operational modes to the main controller of the appliance. Although conventional WiFi/ZigBee/PLC communication solutions are becoming commonplace, this disclosure introduces numerous additional lower cost, reliable solutions to trigger "load shedding" responses in appliances or other users of power. This system may also utilize the commonplace solutions as parts of the communication protocols.

BRIEF DESCRIPTION OF THE DISCLOSURE

According to one aspect, an appliance for conditioning air of a room comprises one or more power consuming features/functions including a temperature controlling element for one of heating and cooling air. A controller is operatively connected to the one or more power consuming features/functions. The controller is configured to receive and process a signal indicative of a utility state. The controller operates the appliance in one of a plurality of operating modes, including at least a normal operating mode and an energy savings mode in response to the received signal. The controller is configured to at least one of selectively adjust and deactivate at least one of the one or more power consuming features/functions to reduce power consumption of the appliance in the energy savings mode.

According to another aspect, an air conditioner control method is provided. A state for an associated energy supplying utility is determined. The utility state is indicative of at least a peak demand period or an off-peak demand period. The air conditioner is operated in a normal mode during the off-peak demand period. The air conditioner is operated in an energy savings mode during the peak demand period. Any number of one or more power consuming features/functions of the air conditioner is selectively adjusted and/or deactivated to reduce power consumption of the air conditioner in the energy savings mode, including adjusting a setpoint temperature to precipitate less refrigeration system on time in the energy savings mode. The normal mode is returned to after the peak demand period is over.

According to yet another aspect, a combination air conditioner and heat pump comprises a casing mountable within an opening into a room. The casing has openings respectively communicating with indoor and outdoor air. A refrigeration system is mounted within the casing. The refrigeration system includes a compressor, a condenser and an evaporator in a refrigerant flow relationship. At least one fan is mounted in the casing for selectively drawing one of outdoor air and indoor air to one of the condenser and evaporator. A controller is configured to receive and process an energy signal. The signal has a first state indicative of a utility peak demand period and a second state indicative of a utility off-peak demand period. The controller operates the combination air conditioner and heat pump in one of an energy savings mode and a normal operating mode based on the received signal being in the first and second states respectively. The controller is configured to one of increase and decrease a setpoint temperature of the refrigeration system and adjust a duty cycle of the compressor to precipitate less compressor on time in the energy savings mode unless performance degradation of the combination air conditioner and heat pump is detected.

The present disclosure reduces power consumption during on-peak hours by reducing the energy demand on the power generation facility, and also enabling the user/consumer to pay less to operate the appliance on an annual basis.

This disclosure is a low-cost alternative to using expensive or complicated methods of determining when peak electrical rates apply. For example, when the refrigerator is in peak shaving mode (or it could be programmed to do this constantly), an ambient light sensor determines when it is morning, and then stays in energy-saving mode for a predetermined number of hours. Preferably, the system will need a counter to know that the room has been dark for a predetermined number of hours. When the lights come on for a certain length of time, then the system knows, for example, that it is morning.

This disclosure provides a peak-shaving appliance such as a refrigerator, including a method to determine when to go into peak-shaving mode without using additional components, or components that have another purpose, and provides a high percentage of the maximum benefit for negligible cost. The two components needed for this are an ambient light sensor and a timer. The kitchen will be dark for an extended period of time while everyone is sleeping. The light sensor and the timer will be used to determine that it is nighttime and morning can be determined by the light sensor. When the refrigerator determines it is morning, the timer will be used to initiate peak shaving mode after some delay time. For example, peak shaving mode could start three hours after it is determined morning starts. Similarly, the ambient light sensor can also be used for dimming the refrigerator lights. This disclosure advantageously uses ambient light to determine when to start peak shaving.

An appliance interface can be provided for all appliances leaving the module to communicate with the AMI system. The system provides for appliance sales with a Demand Side Management capable appliance. The Demand Side Management Module (DSMM) is provided to control the energy consumption and control functions of an appliance using a communication method (including but not limited to PLC, FM, AM SSB, WiFi, ZigBee, Radio Broadcast Data System, 802.11, 802.15.4, etc.). The modular approach will enable an appliance to match electrical utility communication requirements. Each electrical utility region may have different communication methods, protocol methods, etc. This modular approach allows an appliance to be adapted to a particular geographical area of a consumer or a particular electrical provider. The module can be added as a follow on feature and applied after the appliance is installed. Typical installations could include an integral mounted module (inside the appliance or unit) or an externally mounted module (at the wall electrical receptacle or anywhere outside the appliance or unit). The module in this disclosure provides for 2 way communications if needed, and will provide for several states of operation—for example, 1) normal operation, 2) operation in low energy mode (but not off), and 3) operation in lowest energy mode.

This module could be powered from the appliance or via a separate power supply, or with rechargeable batteries. The rechargeable batteries could be set to charge under off-peak conditions. With the module powered from the appliance, the appliance could turn it off until the appliance needed to make a decision about power usage, eliminating the standby power draw of the module. If powered separately, the appliance could go to a low energy state or completely off, while the module continued to monitor rates.

Use of RFID tags in one proposed system should offer significant savings since the RFID tags have become very low cost due to the proliferation of these devices in retail and will effectively allow the enabled appliance to effectively communicate with the utility meter (e.g., receive signals from the utility meter). This system makes it very easy for a customer to manage energy usage during peak demand periods and lowers the inconvenience level to the customer by not shutting off appliances in the home by the utility. When local storage and local generation are integrated into the system, then cost savings are seen by the customer. This system also solves the issue of rolling brownouts/blackouts caused by excessive power demand by lowering the overall demand. Also, the system allows the customer to pre-program choices into the system that will ultimately lower utility demand as well as save the customer money in the customer's utility billing. For instance, the customer may choose to disable the defrost cycle of a refrigerator during peak rate timeframes. This disclosure provides for the controller to "communicate" with the internal appliance control board and command the appliance to execute specific actions with no curtailment in the energy supply. This disclosure further provides a method of communicating data between a master device and one or more slave devices using RFID technology. This can be a number of states or signals, either using one or more passive RFID tags that resonate at different frequencies resonated by the master, or one or more active RFID tags that can store data that can be manipulated by the master device and read by the slave device (s). The states in either the passive or active RFID tags can then be read by the microcontroller on the slave device(s) and appropriate functions/actions can be taken based upon these signals.

Another exemplary embodiment uses continuous coded tones riding on carrier frequencies to transmit intelligence, for example, when one is merely passing rate information such as rate 1, 2, 3, or 4, using the tones to transmit the signals. One could further enhance the details of the messaging by assigning a binary number to a given tone, thus allowing one to "spell out" a message using binary coding with multiple tones. The appliance microcomputer would be programmed to respond to a given number that would arrive in binary format.

One advantage of this approach is that customers have complete control of their power. There have been proposals by utilities to shut off customers if they exceed demand limits or increase the number of rolling brownouts. This method also gives a customer finer granularity in their home in terms of control. A customer does not have to load shed a room just to manage a single device.

This disclosure also advantageously provides modes of load shedding in the appliance, lighting, or HVAC other than "on/off" to make the situation more acceptable from the perspective of the customer.

An advantage of the present disclosure is the ability to produce appliances with a common interface and let the module deal with the Demand Side Management.

Another advantage is the ability to control functions and features within the appliance and/or unit at various energy levels, i.e., as opposed to just an on/off function.

Another advantage is that the consumer can choose the module or choose not to have the module. If the module is chosen, it can be matched to the particular electrical utility service provider communication method of the consumer.

Another benefit is the increased flexibility with an associated electrical service provider, and the provision of several modes of operation (not simply an on/off mode). The module can be placed or positioned inside or outside the appliance and/or unit to provide demand side management.

Still other benefits relate to modularity, the ability to handle multiple communication methods and protocols without adversely impacting the cost of the appliance, opening up appliances to a variety of protocols, enabling demand side management or energy management, and/or providing for a standard interface to the appliance (for example, offering prechill and/or temperature set change during on-peak hours).

Low cost, reliable RF transmissions within the home, rather than using industrial solutions such as PLC or Zigbee solutions which are significantly more costly than the aforementioned system.

Still other features and benefits of the present disclosure will become apparent from reading and understanding the following detailed description.

BRIEF DESCRIPTION OF THE DRAWINGS

FIGS. 1-21 illustrate exemplary embodiments of an energy management system for household appliances.

DETAILED DESCRIPTION OF THE PREFERRED EMBODIMENTS

Figure 1:
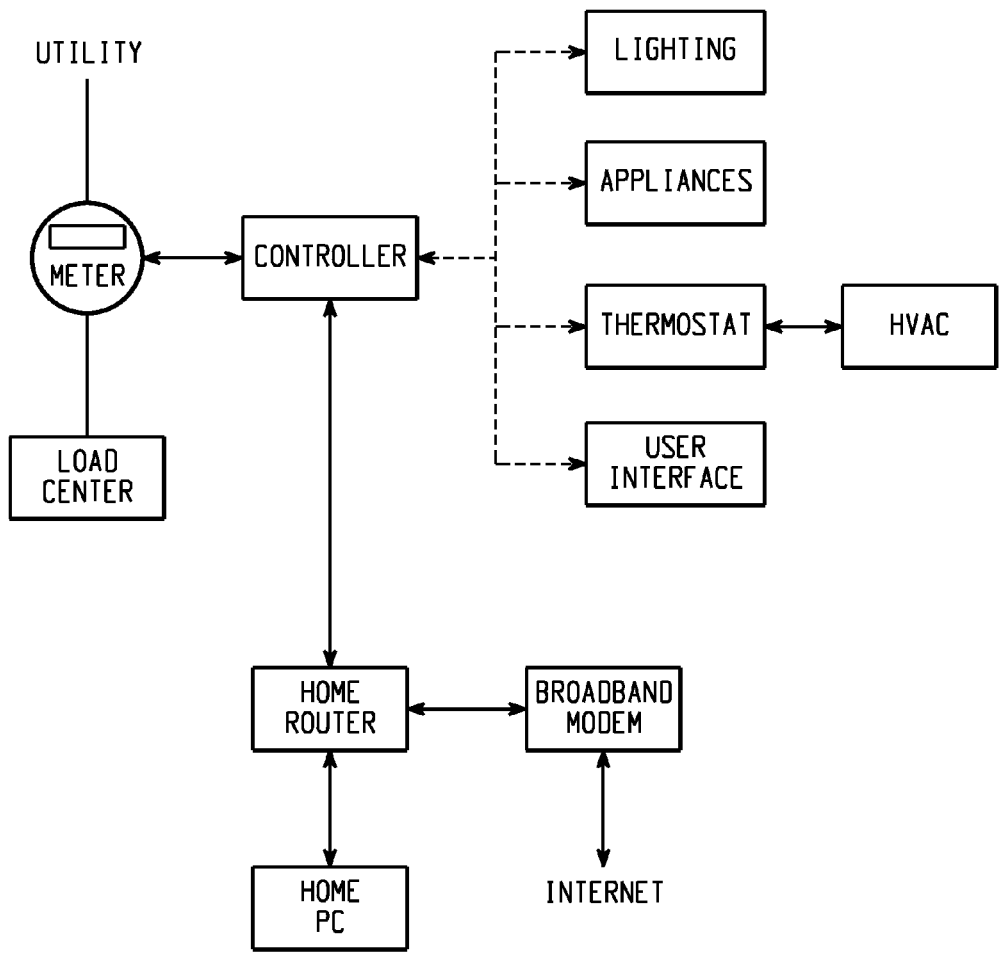
Figure 2:
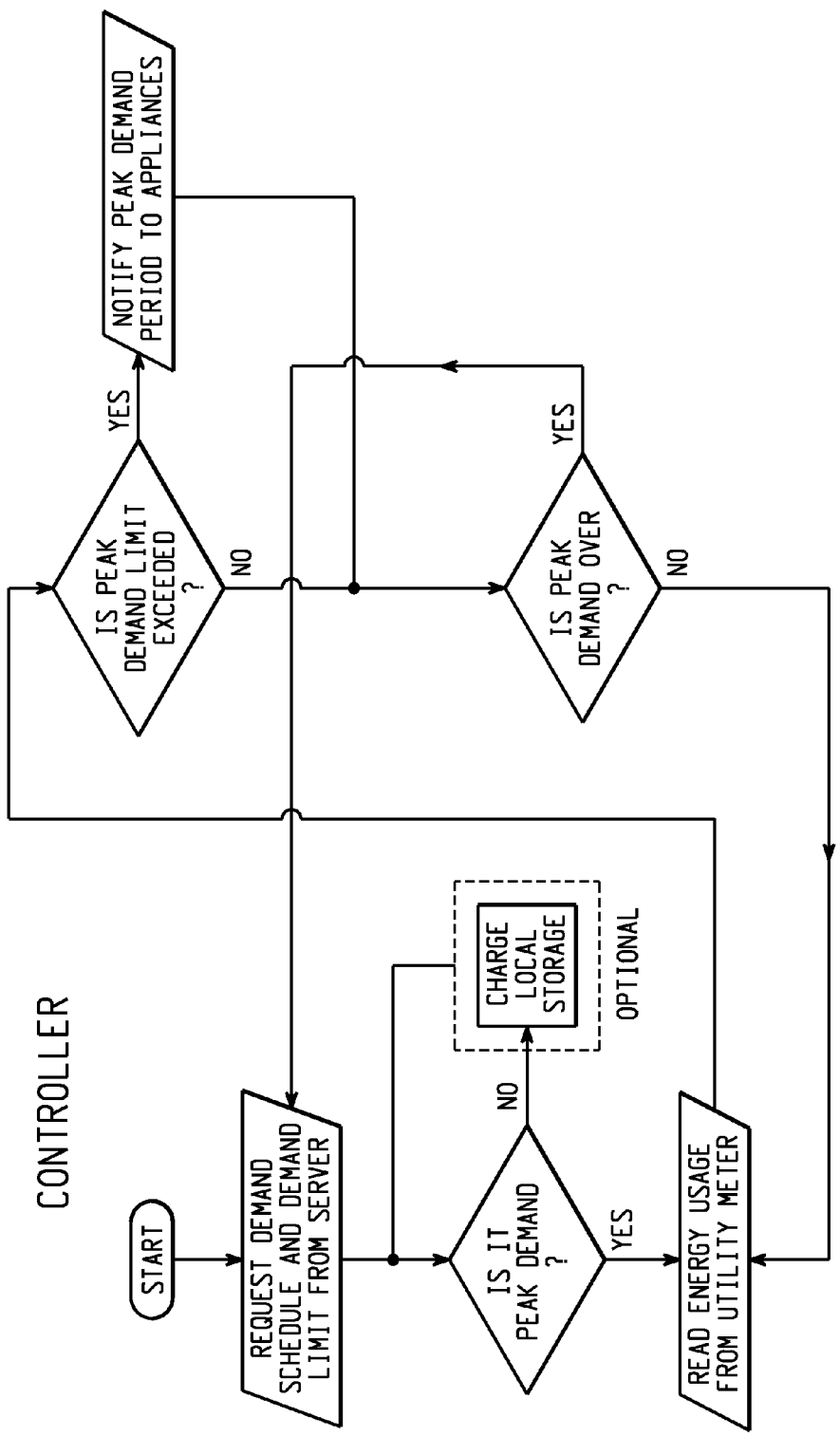

In one embodiment, a more advanced system is provided to handle energy management between the utility and the homeowner's appliances. The system can include one or more of the following: a controller, utility meter, communication network, intelligent appliances, local storage, local generator and/or demand server. Less advanced systems may actually allow the appliance to "communicate directly with the utility meter or mesh network through the DSSM (Demand Side Management Module) (FIG. 1). The demand server is a computer system that notifies the controller when the utility is in peak demand and what is the utility's current demand limit. A utility meter can also provide the controller the occurrence of peak demand and demand limit. The demand limit can also be set by the home owner. Additionally, the homeowner can choose to force various modes in the appliance control based on the rate the utility is charging at different times of the day. The controller will look at the energy consumption currently used by the home via the utility meter and see if the home is exceeding the demand limit read from the server. If the demand limit is exceeded, the controller will notify the intelligent appliances, lighting and thermostat/HVAC (FIG. 2).

Figure 3:
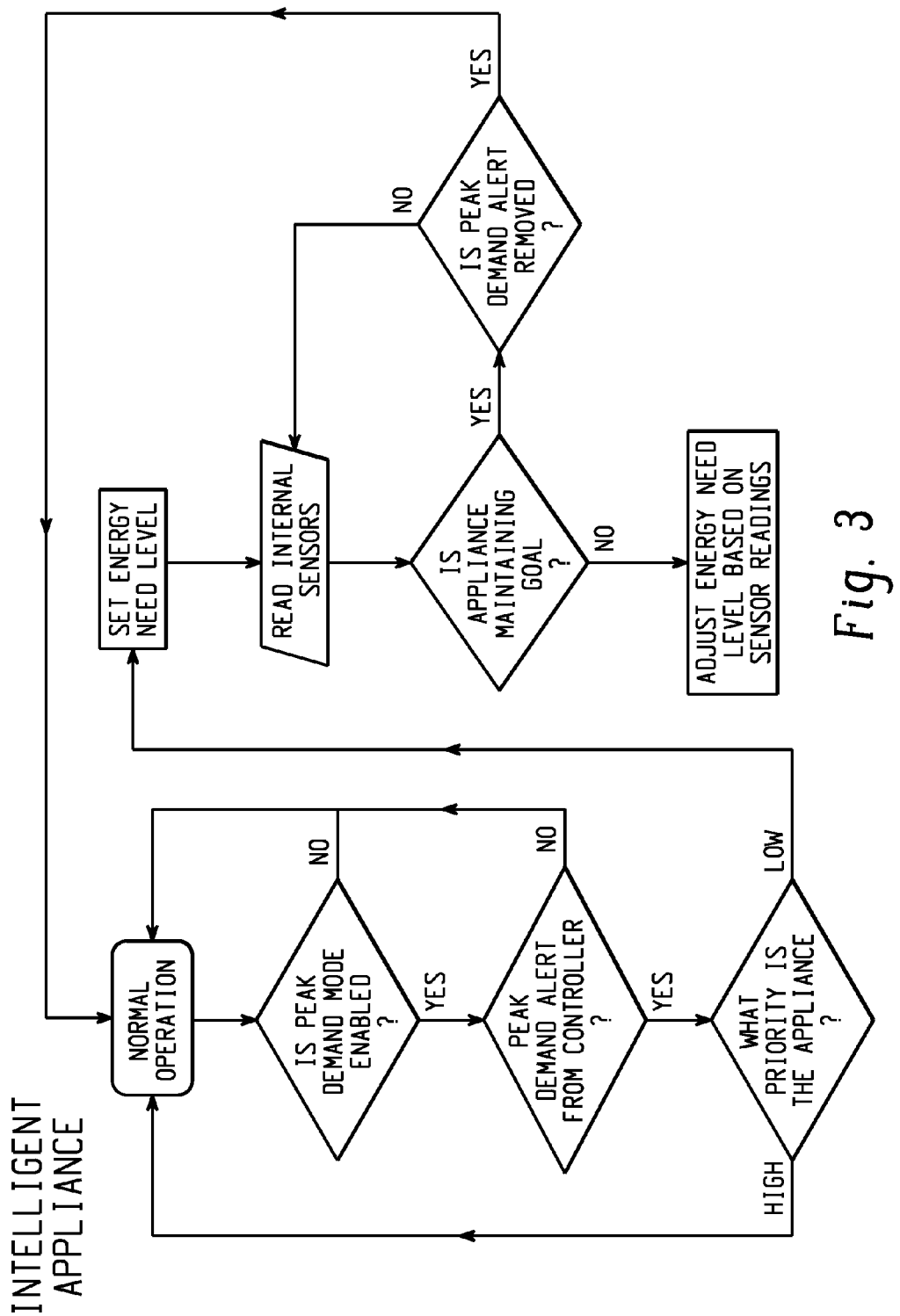

Each intelligent appliance has a communication interface that links itself to the controller (FIG. 3). This interface can be power-line carrier, wireless, and/or wired. The controller will interact with the appliance and lighting controls as well as thermostat (for HVAC) to execute the users preferences/settings.

Enabled appliances receive signals from the utility meter and help lower the peak load on the utility and lower the amount of energy that the consumer uses during high energy cost periods of the day. There are several ways to accomplish this, through wireless communication (ZigBee, WiFi, etc) or through PLC (power line carrier) communication. Alternatively, using passive RFID tags that resonate at different frequencies resonated by the master, or one or more active RFID tags that can store data that can be manipulated by the master device and read by the slave devices(s) is an effective and potentially lower cost communication solution since there is no protocol. Rather, a pulse of energy at a particular frequency will allow a low cost method with an open protocol for transmitting/communicating between a master device and one or more slave devices, and appropriate functions/actions can be taken based upon these signals.

Figure 4:
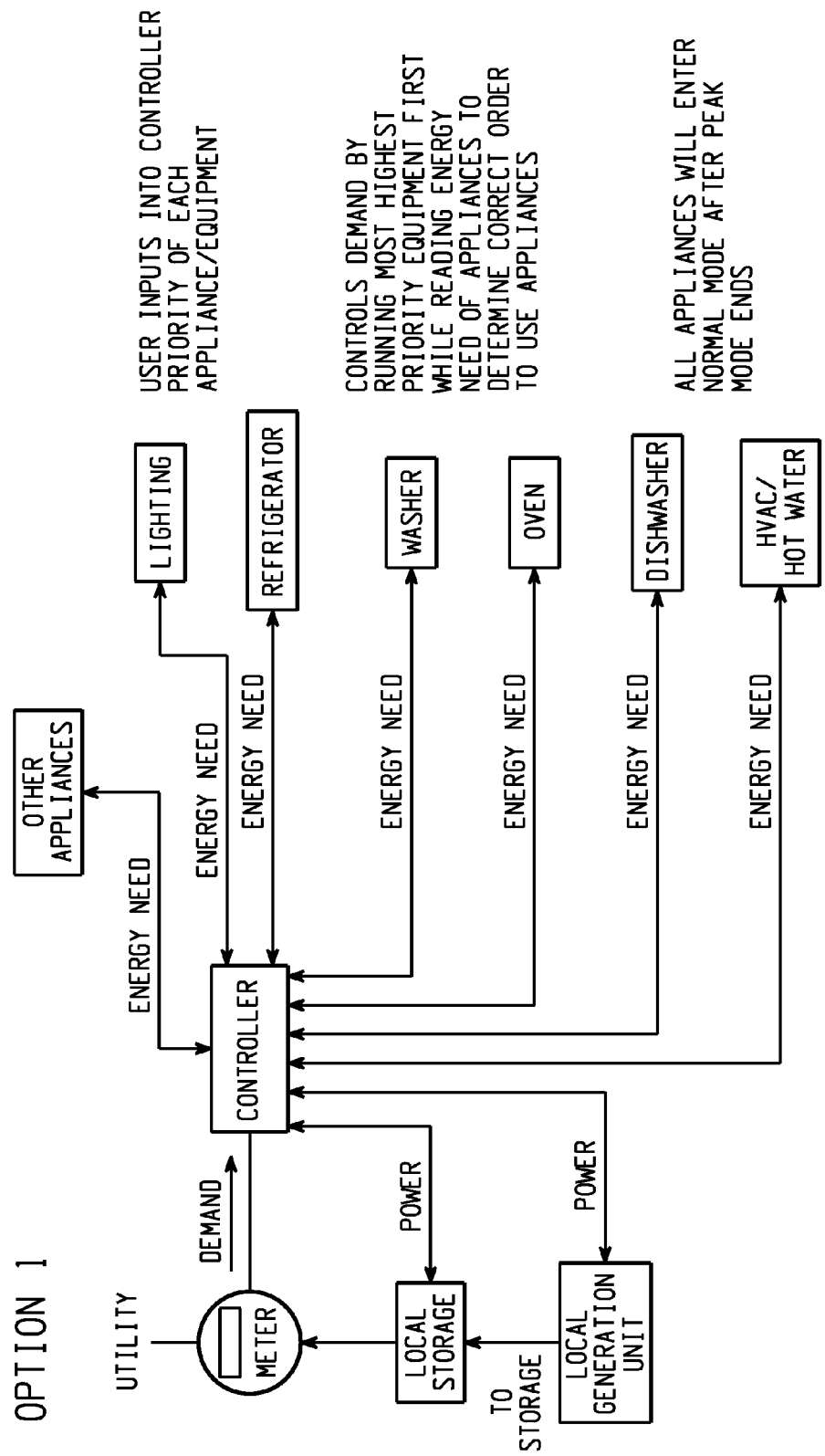

The interaction between controller and appliances can occur in two ways. For example, in one scenario during a peak demand period, the controller will receive a demand limit from the utility, demand server or user. The controller will then allocate the home's demand based on two factors: priority of the appliance and energy need level (FIG. 4). The priority dictates which appliances have higher priority to be in full or partial energy mode than other appliances. Energy need dictates how much energy is required for a certain time period in order for that appliance to function properly. If the appliance's energy need is too low to function properly, the appliance moves to a normal mode or a higher energy need level. The energy saving mode is typically a lower energy usage mode for the appliance such as shutdowns of compressors and motors, delayed cycles, higher operating temperatures in summer or lower operating temperatures in winter until the peak demand period is over. Once the demand limit is reached, the appliances will stay in their energy mode until peak demand is over, or a user overrides, or appliance finishes need cycle or priority changes. The controller constantly receives status updates from the appliances in order to determine which state they are in and in order to determine if priorities need to change to accomplish the system goals.

Figure 5:
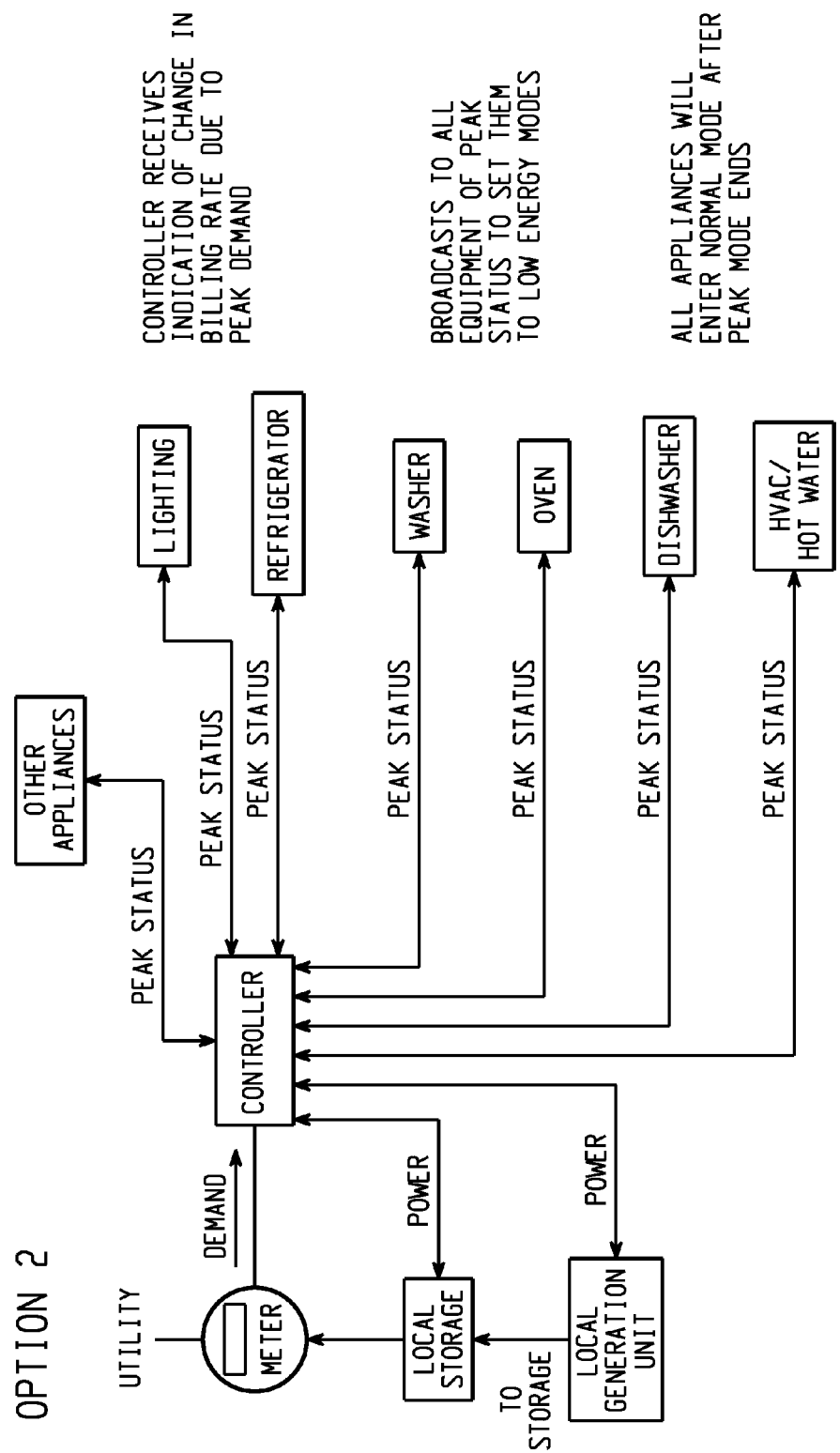

In a second scenario, for example, a set point is provided. During a peak demand period, the controller will tell each appliance to go into peak demand mode (FIG. 5). The appliance will then go into a lower energy mode. The customer can deactivate the energy savings mode by selecting a feature on the appliance front end controls (i.e. user interface board) before or during the appliance use or at the controller. The controller can also communicate to a local storage or power generation unit. This local unit is connected to the incoming power supply from the utility. The controller notifies the storage unit to charge when it is not in peak demand, if a storage unit is included and available. If the storage unit has enough energy to supply the appliances during peak demand, then the controller will switch the home's energy consumption from the utility to the storage unit. The unit can also be local generator/storage such as solar, hydrogen fuel cell, etc.

Figure 6:
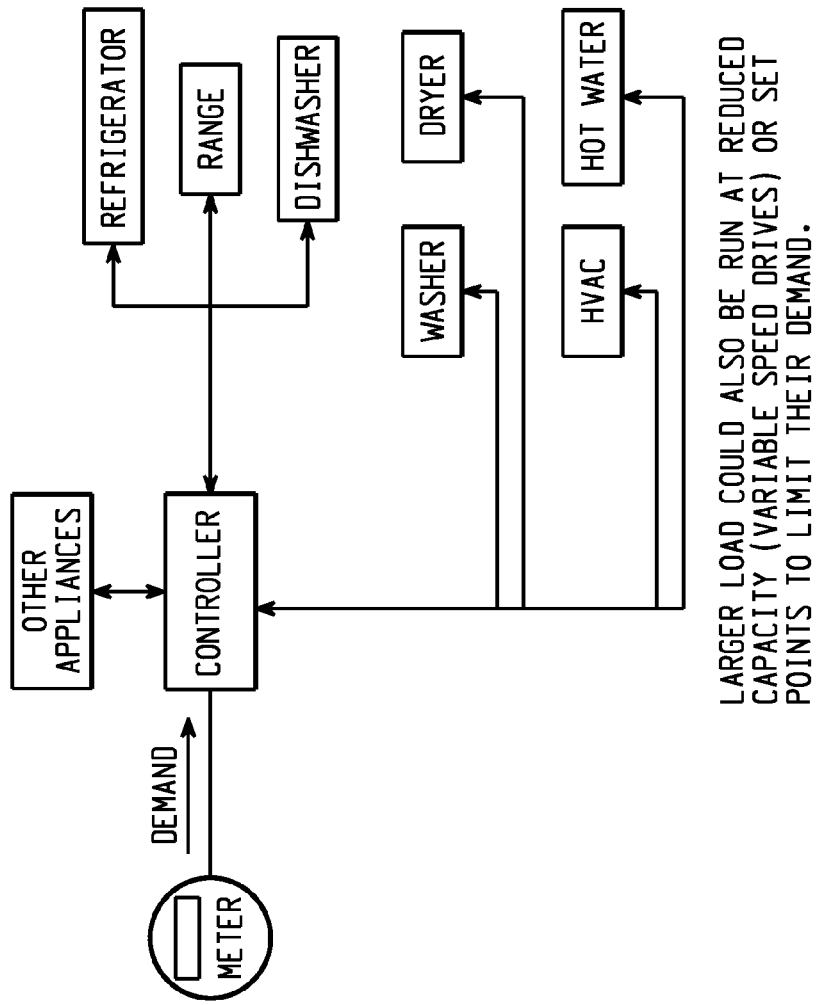
Figure 7:
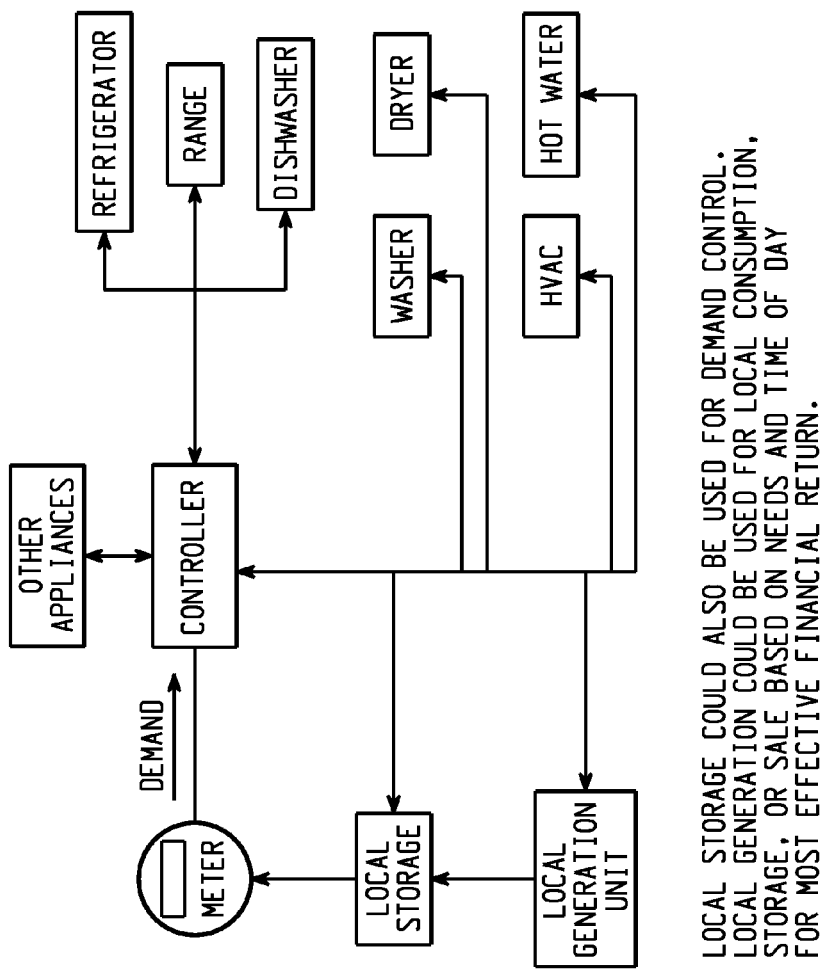
Figure 8:
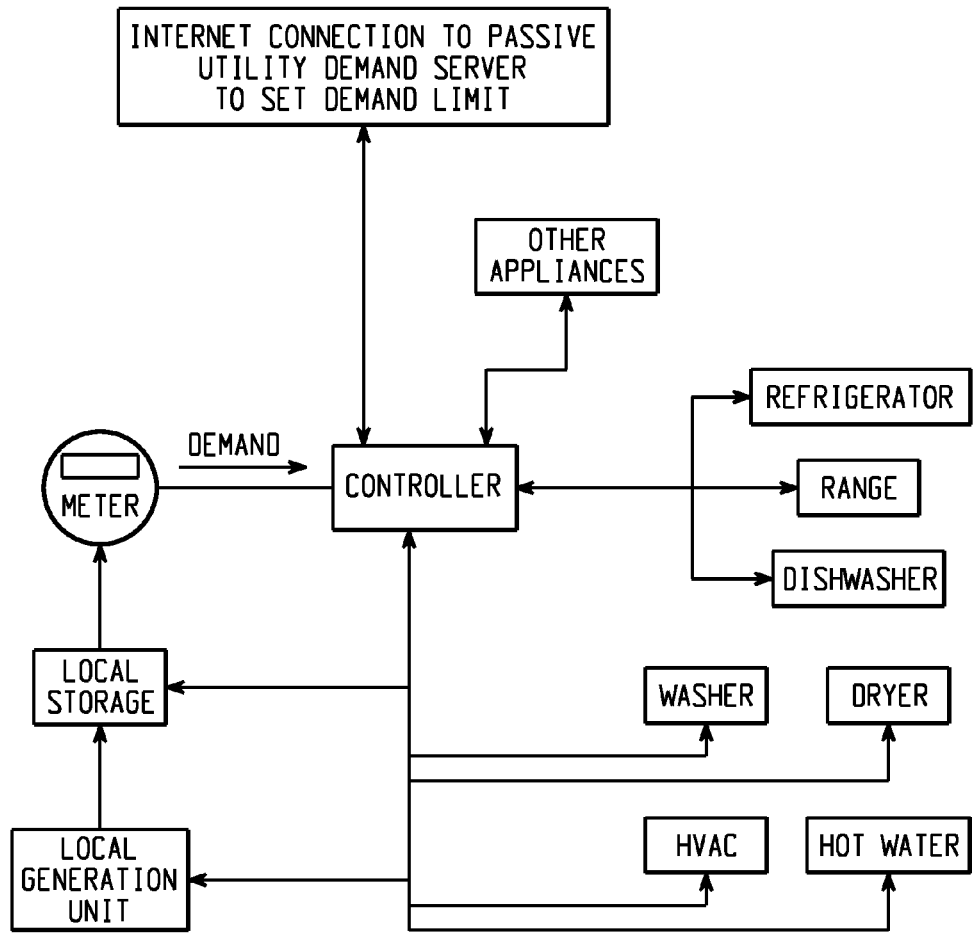

The central controller handles energy management between the utility and home appliances, lighting, thermostat/HVAC, etc. with customer choices incorporated in the decision making process. The controller may include notification of an energy saving mode based on demand limit read from one or more of a utility meter, utility, demand server or user. An energy savings mode of an appliance can thereby be controlled or regulated based on priority and energy need level sent from the controller and/or the customer (FIG. 6). Likewise, consideration to use of local energy storage and use of a local generator to offset peak demand limit can be incorporated into the energy management considerations, or provide the ability to override mode of energy savings through the controller or at the appliance, lighting, or thermostat/HVAC (FIGS. 7 and 8).

The present disclosure has the ability for the home to shed loads in pending brown-out or black-out situations, yet have intelligence to prevent an improper action such as shutting down the refrigerator for extended timeframes that might compromise food storage safety.

How much energy the appliance consumes in peak demand is based on priority of the device and the energy need level. If the appliance's priority is high, then the appliance will most likely not go into a saving mode. The energy need level is based on how little energy the appliance can consume during peak demand and still provide the function setting it is in (i.e. in a refrigerator, ensuring that the temperature is cool enough to prevent spoiling). It will also be appreciated that an appliance may have multiple energy need levels.

The controller will be the main product with the communication and settings control incorporated within future appliances. Specific meters will be selected so that the controller can read the demand usage. It is intended that the demand server will possibly be purchased or leased to the utility.

A method is provided for constructing an appliance designed to perform any key function, the appliance comprises of several mechanical and electrical elements controlled by a main controller. This main controller has a port for receiving information regarding the operational state of the appliance. The port also has a user interface or switch which could be used to override the information received by the controller through the port. Two-way or one-way communication devices may be connected to the port. These communication devices will receive signals from a remote controller, process those signals and as a result communicate an operational state to the main controller of the appliance. This operational state is communicated to the main controller by one or more remote controllers in a specific format determined by the appliance. These signals from the remote controller(s) could be based on a variety of communication methods and associated protocols. On receiving the operational state signal, the appliance main controller causes the appliance to run a predetermined operational mode. These operational modes are designed into the appliance(s) and result in different resource consumption levels or patterns, even delaying use. Resources could include energy, water, air, heat, sunlight, time, etc. In future appliance models, the consumer might be given the authority to modify the appliance responses to a given rate signal. The consumer would be presented a "check box" of potential response modes and allowed to choose within set parameters. For instance, the consumer might be allowed to choose the amount of temperature adjustment a refrigerator will make in response to a high utility rate.

A method of communicating data between a master device and one or more slave devices may advantageously use continuous tone-coded transmission system. This can be a number of states or signals, either using one or more continuous tones that signify different rate states coming from the home area network (from meter) or the utility. Additionally, one could send a combination of tones to transmit binary messages using a few tones. The slave devices will incorporate a receiver that receives the carrier frequency and then decodes the continuous tone which corresponds to the particular state of the utility rate. Once the "receiver board" detects the tone, then the downstream circuitry will trigger the appropriate response in the appliance. The carrier frequency in this scheme can be numerous spectrums, one being the FM broadcast band or a specific FM band allocated by the FCC for low level power output. The advantage of broadcast band FM is the low cost of such devices and the potential to penetrate walls, etc. within a home with very low levels of power due to the long wavelength of the 89-106 Mhz carrier. This process is used today in 2-way radio communications to reduce the annoyance of listening to multiple users on shared 2-way radio frequencies. The process in these radios is referred to as CTCSS (continuous tone-coded squelch system) and would find application in this end use.

Generally, it is not known to have modular interfaces that can receive signals from a control source. Also, no prior arrangements have functioned by addressing the control board of the appliance with a signal that directs the appliance to respond.

Thus, by way of example only, the structure and/or operation of a refrigerator (FIG. 9, although other appliances are also represented) may be modified or altered by reducing the temperature, especially in the freezer compartment pre on-peak time and further temporarily provide a compartment temperature increase to shave on-peak load. Specifically, defrost operation could be delayed until off-peak time. Alternatively or conjunctively, the freezer and refrigerator temperature setpoints may be set to maintain less compressor on time during on-peak demand times. Similarly, the refrigerator/freezer could be programmed so that lights will not be permitted to come on or the lights must be dimmed lights during on-peak demand times. During on-peak demand times, the fan operating speeds can be reduced, and/or compressor operating speed reduced in order to reduce energy consumption. Still another option is to reduce the delay time for the door alarm to sound during on-peak time. Other power load reducing measures in a refrigerator may include (reducing before on-peak hours) the temperature of the freezer and refrigerator compartments in a refrigerator (prechill) and slightly increase temperature setting during on-peak rates. For example, just before peak rate time, the temperature setting could be decreased by 1-2 degrees (during off-peak rates). Some communication line with the electrical company could be established. Thus, the electrical company may be able to send a signal in advance to prechill the refrigerator (or in the case of an air conditioner, decrease the room temperature during off-peak rates as a pre-chill maneuver) and, in turn, increase the temperature setting during on-peak rates.

Figure 12:
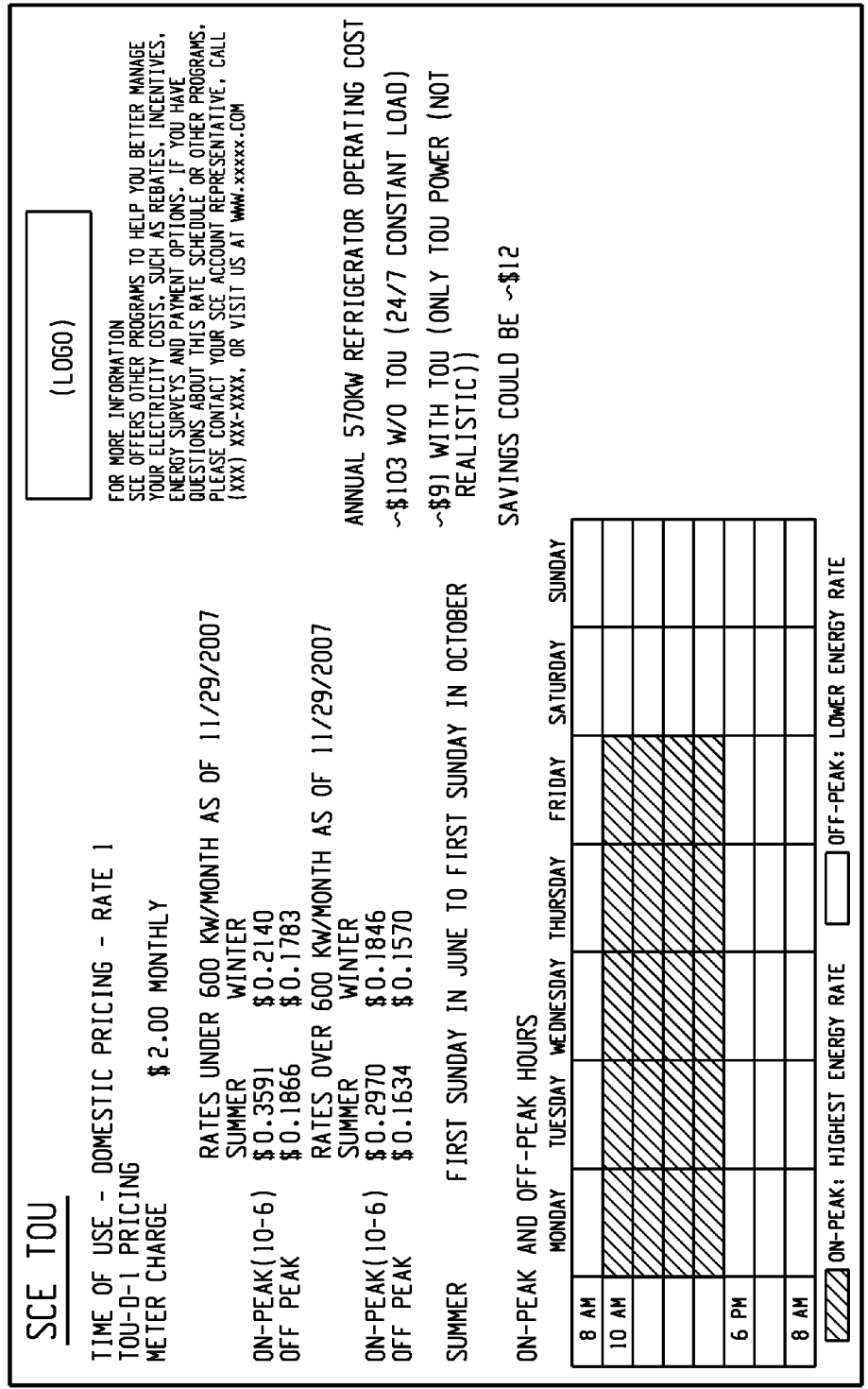
Figure 14:
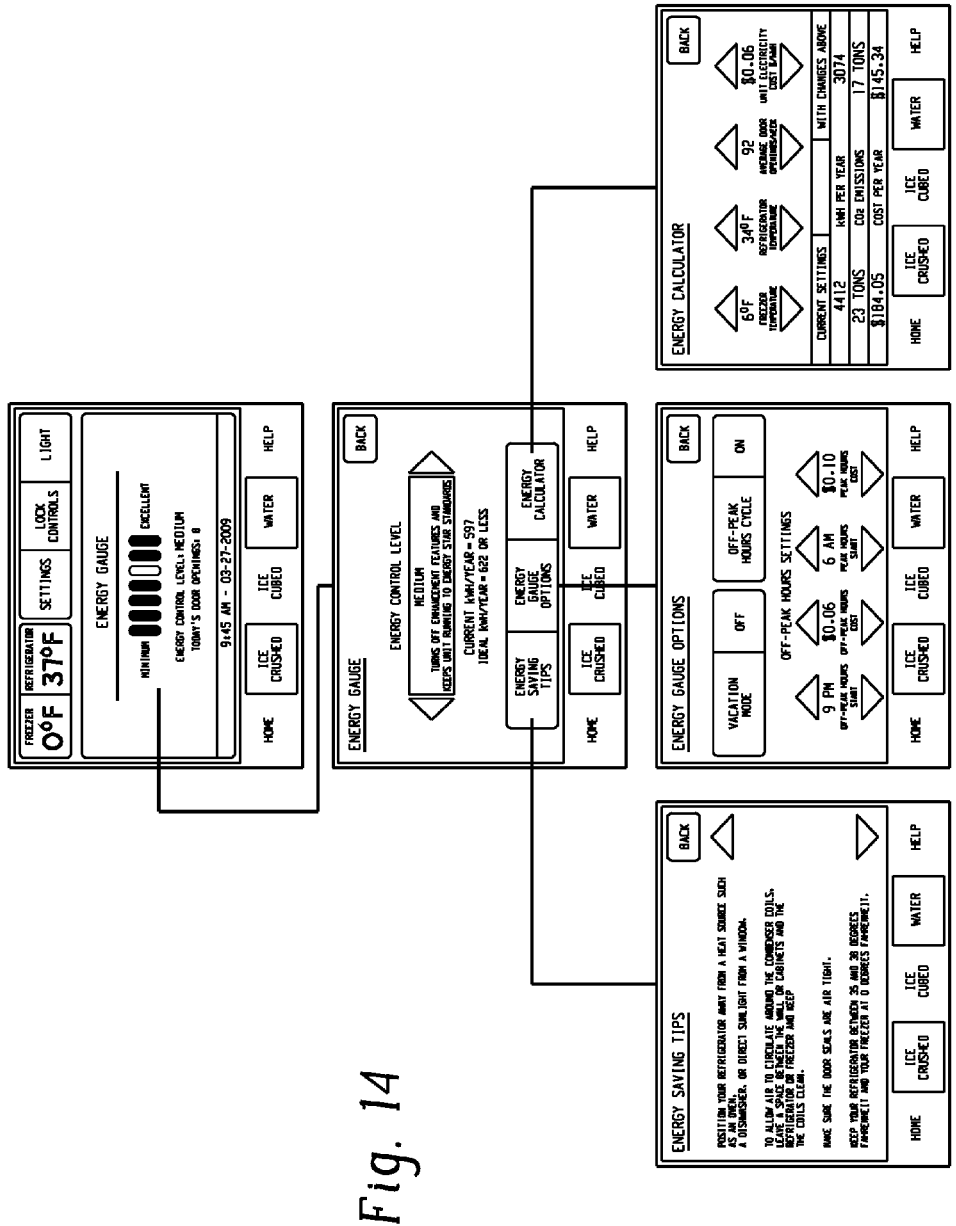
Figure 15:
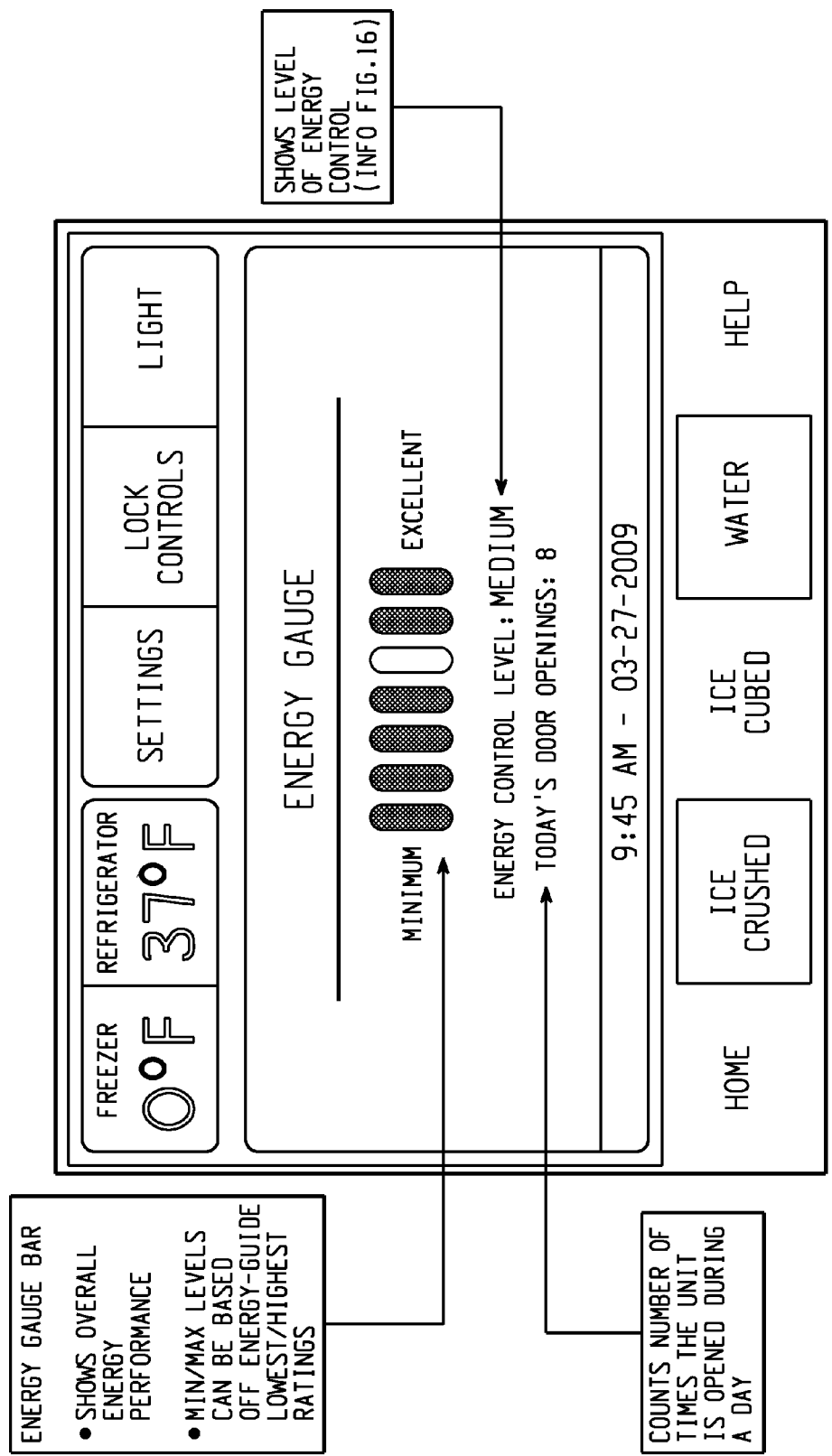
Figure 16:
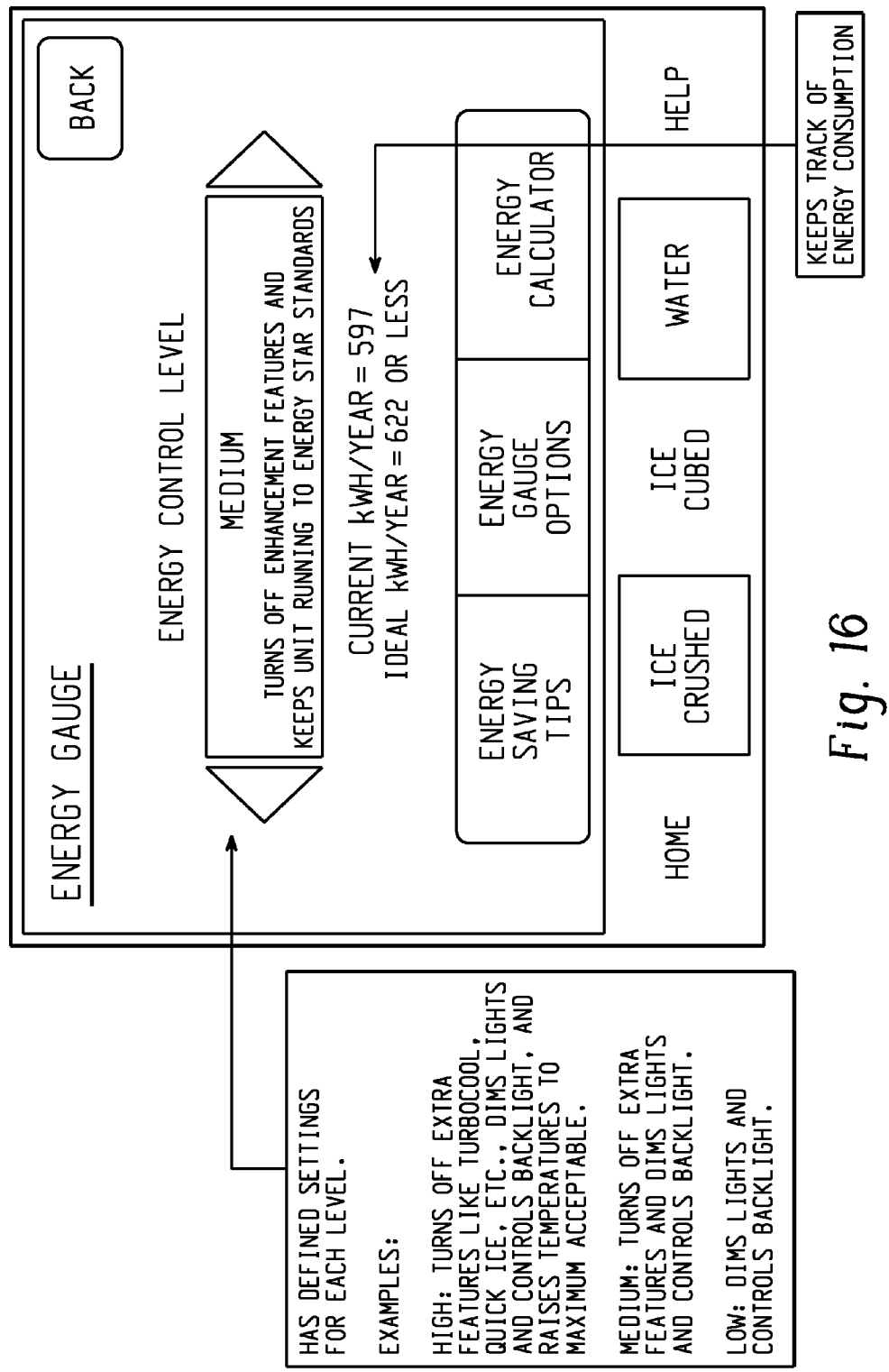
Figure 17:
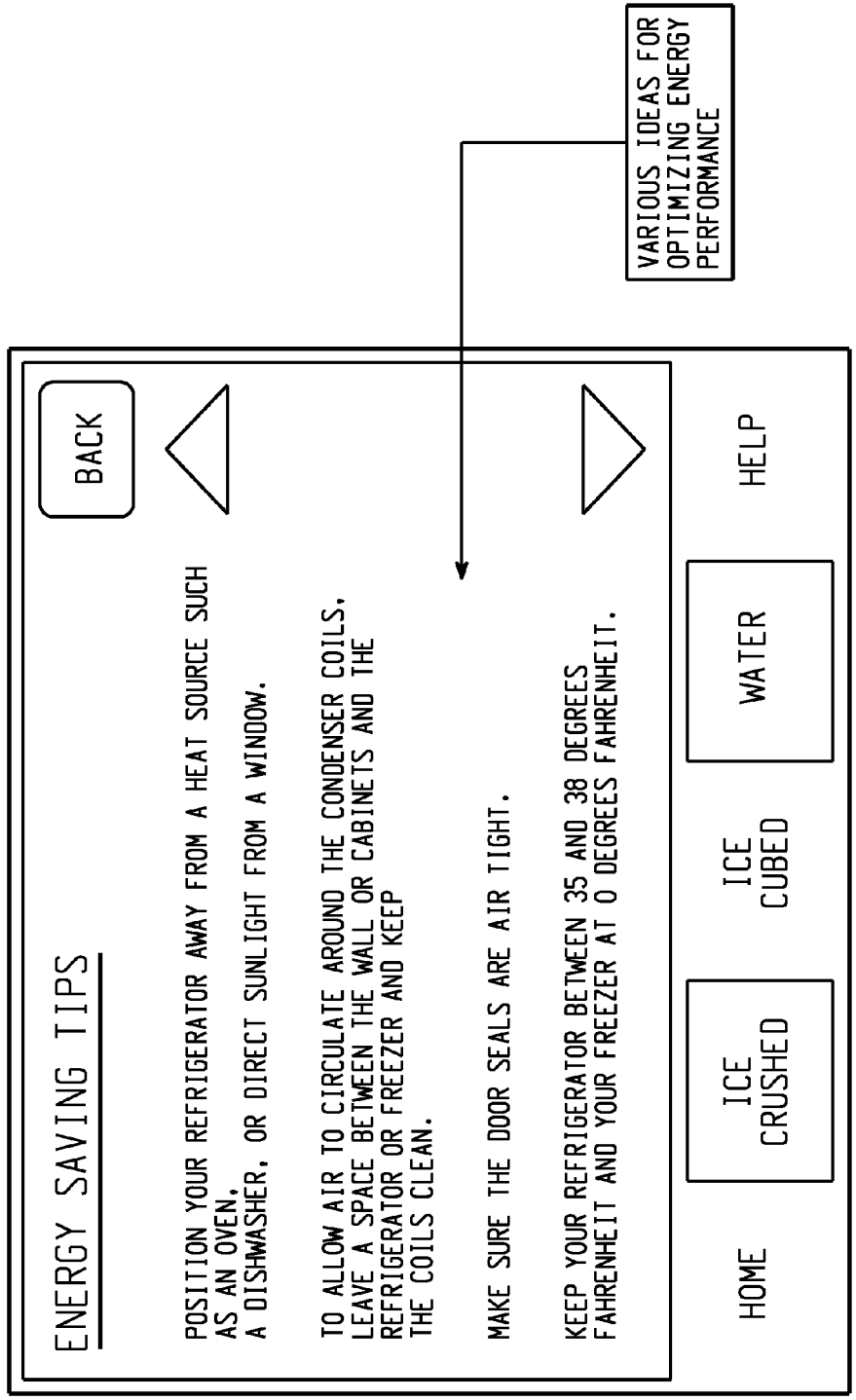
Figure 18:
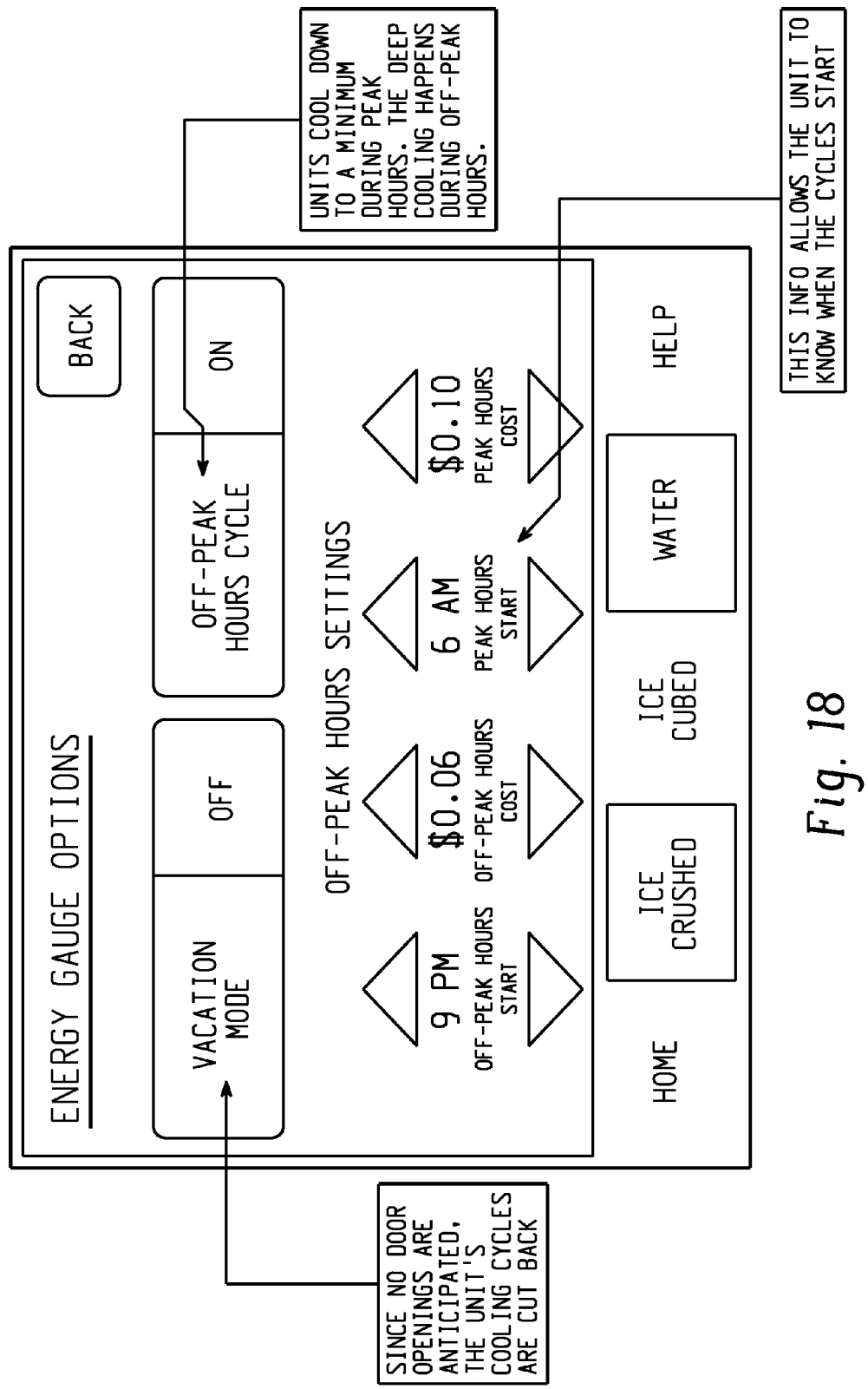

Still other energy consuming practices of the exemplary refrigerator that may be altered include turning the ice-maker off during on-peak demand times, or disabling the crushed ice mode during on-peak demand times. Alternatively, the consumer may be given the ability to select via a user interface which items are incorporated into the on-peak demand via an enable/disable menu, or to provide input selection such as entry of a zip code (FIG. 10) in order to select the utility company and time of use schedule (FIG. 11), or using a time versus day of the week schedule input method (FIGS. 12-13).

The user interface may also incorporate suggested energy saving tips or show energy usage, or provide an indicator during on-peak mode, or provide a counter to illustrate the energy impact of door opening, or showing an energy calculator to the consumer to serve as a reminder of the impact of certain selections/actions on energy use or energy conservation (FIGS. 14-19).

One path that is being pursued from the appliance perspective is to allow the onboard CPU (microprocessor) of the appliance to determine how to respond to an incoming signal asking for a load shedding response. For example, the CPU will turn on, turn off, throttle, delay, adjust, or modify specific functions and features in the appliance to provide a turndown in power consumption (FIG. 20). FIG. 21 defines specifically exemplary modes of what are possible. The main feature here is the enabling of the main board microprocessor or CPU to execute actions in the appliance to deliver load shedding (lowering power consumption at that instant). The actions available in each appliance are only limited to the devices that the CPU has control over, which are nearly all of the electrical consuming devices in an appliance. This may work better where the appliance has an electronic control versus an electromechanical control.

Of course, the above description focuses on the refrigerator but these concepts are equally applicable to other home appliances such as dishwashers, water heaters, washing machines, clothes dryers, televisions (activate a recording feature rather than turning on the television), etc., and the list is simply representative and not intended to be all encompassing.

Likewise, although these concepts have been described with respect to appliances, they may find application in areas other than appliances and other than electricity usage. For example, a controller that acts as an intermediary between the utilities meter and the appliance interprets the utility signal, processes it and then submits this signal to the appliance for the prescribed reaction. In a similar fashion, the controller may find application to other household utilities, for example, natural gas and water within the home. One can equip the water and gas meters to measure flow rates and then drive responses to a gas water heater or gas furnace precisely like the electrical case. This would assume that one might experience variable gas and water rates in the future. Secondly, the flow meters being connected to the controller could provide a consumer with a warning as to broken or leaking water lines by comparing the flow rate when a given appliance or appliances are on to the normal consumption. In cases where safety is a concern, the system could stop the flow of gas or water based on the data analysis.

Another feature might be the incorporation of "remote subscription" for the utility benefit. In some cases, the utility will be providing customers discounts/rebates for subscribing to DSM in their appliances, hot water heaters, etc. The "remote subscription" feature would allow the utility to send a signal that would "lockout" the consumer from disabling the feature since they were on the "rebate" program.

Another feature that the controller lends itself to is the inclusion of "Remote diagnostics". This feature would allow the appliance to send a signal or message to the controller indicating that something in the appliance was not up to specifications. The controller could then relay this signal to the utility or to the appliance manufacturer via the various communication avenues included into the controller (i.e., WIFI, WIMAX, Broadband, cell phone, or any other formats that the controller could "speak").

In the case of a remote subscription, the utilities today rely on the honesty of their subscribers to leave the DSM system functional. Some people may receive the discounts/rebate and then disable the feature that drives the load shedding. With this system, the utility can ensure that the feature will be enabled and provide the proper load shedding.

According to one aspect, an appliance 100 for conditioning air of a room comprises one or more power consuming features/functions including a temperature controlling element for one of heating and cooling air. A controller 104 is operatively connected to each of the power consuming features/functions. The controller 104 can include a micro computer on a printed circuit board which is programmed to selectively control the energization of the power consuming features/functions. The controller 104 is configured to receive and process a signal 108 indicative of a utility state, for example, availability and/or current cost of supplied energy. The energy signal may be generated by a utility provider, such as a power company, and can be transmitted via a power line, as a radio frequency signal, or by any other means for transmitting a signal when the utility provider desires to reduce demand for its resources. The cost can be indicative of the state of the demand for the utility's energy, for example a relatively high price or cost of supplied energy is typically associated with a peak demand state or period and a relative low price or cost is typically associated with an off-peak demand state or period.

The controller 104 can operate the appliance 100 in one of a plurality of operating modes, including a normal operating mode and an energy savings mode in response to the received signal. Specifically, the appliance 100 can be operated in the normal mode in response to a signal indicating an off-peak demand state or period and can be operated in an energy savings mode in response to a signal indicating a peak demand state or period. As will be discussed in greater detail below, the controller 104 is configured to selectively adjust and disable at least one of the one or more power consuming features/functions to reduce power consumption of the appliance 100 in the energy savings mode. It should be appreciated that the controller can be configured with default settings which govern normal mode and energy savings mode operation. Such settings in each mode can be fixed while others adjustable to user preference and to provide response to load shedding signals.

Figure 22:
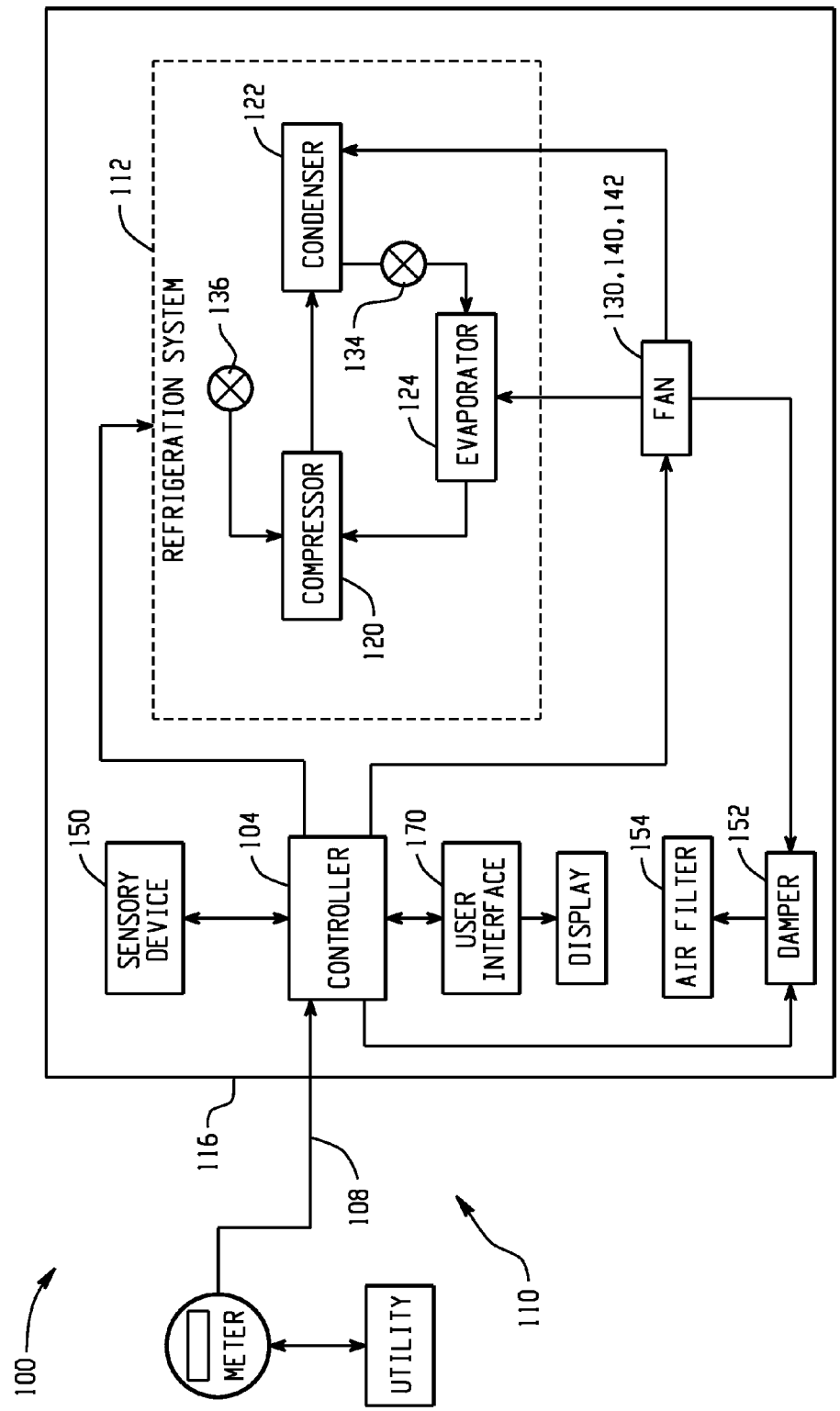
FIG. 22 is a schematic illustration of an exemplary demand managed air conditioner.

An exemplary embodiment of the appliance 100 is schematically illustrated in FIG. 22. In this embodiment, the appliance 100 is an air conditioner 110 with or without a heat pump cycle and the temperature controlling element is a refrigeration system 112. With reference to FIG. 22, the air conditioner 110 comprises a housing or casing 116 mountable within an opening into a room. The casing has openings respectively communicating with indoor and outdoor air. The refrigeration system 112 is mounted within the casing. The refrigeration system includes a compressor 120, a condenser 122 and an evaporator 124 in a refrigerant flow relationship. The condenser and evaporator are one of an indoor heat exchanger and an outdoor heat exchanger, depending on the direction of flow of the refrigerant through the refrigeration system 112, wherein one of the heat exchangers functions to absorb heat and the other heat exchanger functions to dissipate heat. At least one fan 130 is mounted in the casing for selectively drawing one of outdoor air and indoor air to one of the condenser and evaporator. The at least one fan can include a condenser fan for circulating outdoor air over the condenser and an evaporator fan for circulating indoor air over the evaporator.

The refrigeration system 112 is a closed loop system defining passages for a refrigerant fluid to flow. Generally, refrigerant flows to the compressor 120, which can be driven by electrical energy or other suitable power source. The compressor imparts pressure to the refrigerant fluid, thereby increasing its temperature, and discharges the refrigerant in a hot state. The condenser 122 can comprise one or more tubes adapted to receive the hot refrigerant from the compressor. The evaporator 124 is adapted to receive cooled refrigerant from a conduit extending from the condenser. A thermostatic expansion valve 134 can be located on the conduit to meter the flow of liquid refrigerant entering the evaporator at a rate that matches the amount of refrigerant being boiled off in the evaporator. The evaporator is adapted to discharge refrigerant to a conduit which is in communication with the compressor. Condensate from the evaporator is drained off.

More particularly, according to one exemplary embodiment, the housing or casing 116 has a front opening including an inlet and an outlet disposed in the room to be conditioned, and a rear opening including an inlet and an outlet exposed to the outdoor ambient. The refrigeration system 112 is arranged in the casing 116. The interior of the casing 116 can include a partition or barrier that divides the interior of the casing into an indoor compartment and an outdoor compartment in which are mounted respectively the indoor heat exchanger and the outdoor heat exchanger. As indicated previously, the heat exchangers are connected in refrigerant flow relationship with the compressor 120 also positioned in the casing 116.

For a combination air conditioner and heat pump, the refrigeration system 112 is a reversible refrigerant flow type and is provided with a reversing valve 136. The reversing valve 136 may be selectively operated to reverse the flow of refrigerant to the heat exchangers so that they function interchangeably as the evaporator 124 or condenser 122 to heat or cool the respective air streams circulated over the heat exchangers.

When the air conditioner 110 is in operation, air is drawn from within the room through the front opening inlet and circulated by a first fan or blower 140. The room air is directed through the indoor compartment, passes through the indoor heat exchanger, through the front opening outlet. The blower 140 is driven by a motor (not shown) mounted in the casing 116. During the cooling cycle, the indoor heat exchanger is functioning as the system evaporator 124 to cool and dehumidify room air that is circulated through it for conditioning by it. Moisture from the air stream being circulated over the indoor heat exchanger is condensed onto its coiled surfaces. As is well known, a drip tray (not shown) can be provided for collecting this condensate water and delivering it to a water receptacle or sump area formed in a base of the casing 116. The outdoor heat exchanger functions as the system condenser 122 and is cooled by the outdoor air being circulated thereover by a second fan 142 generally driven by the motor. Although, it should be appreciated that a separate motor can be used to drive the second fan.

For an air conditioner having a heat pump cycle, during the heating cycle, the reversing valve 136 is positioned to reverse the flow of refrigerant to the indoor and outdoor heat exchangers, thereupon utilizing the indoor heat exchanger as the system condenser 122 for dissipating heat to heat to heat the room air that is circulated through it. The outdoor heat exchanger, now functioning as the system evaporator 124, condenses moisture out of the outside air. Condensate from the outdoor heat exchanger accumulates in the drip tray. This water collected from the outdoor heat exchanger can be transferred to the indoor compartment when the unit is operating in the heating cycle and therein added to the recirculating indoor air.

According to one aspect, a sensing device 150 can be located on the casing 116. The sensing device is operatively connected to the controller 104 and is configured to measure the temperature of the air in the room and the temperature and/or humidity of the outdoor air. The output of the sensing device 150 is processed by the controller 104. The controller, in response to the sensing device output and depending on the setpoint temperature, selectively actuates the refrigeration system 112. In a cooling mode if the temperature and/or humidity of the outdoor air is less than the setpoint temperature, the controller 104 can deactivate the refrigeration system 112 and selectively draw in outdoor air to the associated room via one of the fans. In this instance, a dryer can be provided to regulate imbalances in humidity. More particularly, according to one exemplary embodiment, the measured outdoor temperature and/or humidity is compared to the setpoint and/or indoor temperatures to determine whether to open a damper 152, thus allowing cooler and low humid outdoor air to circulate into the room. This can allow the refrigeration system 112 to be turned off or run at reduced power/duty cycle thus saving energy. This operational mode can be most effective in the evenings and at night when outside temperatures drop quicker than indoor air, and is suited for general energy conservation regardless of the operating mode of the air conditioner. To limit air particulates from the outside air entering the indoor air, an air filter 154 (for example, HEPA; activated-carbon; UV; ozone; ionizer; etc.) could be added in series with the damper 152, providing both fresh ventilated and filtered air into the room.

Figure 23:
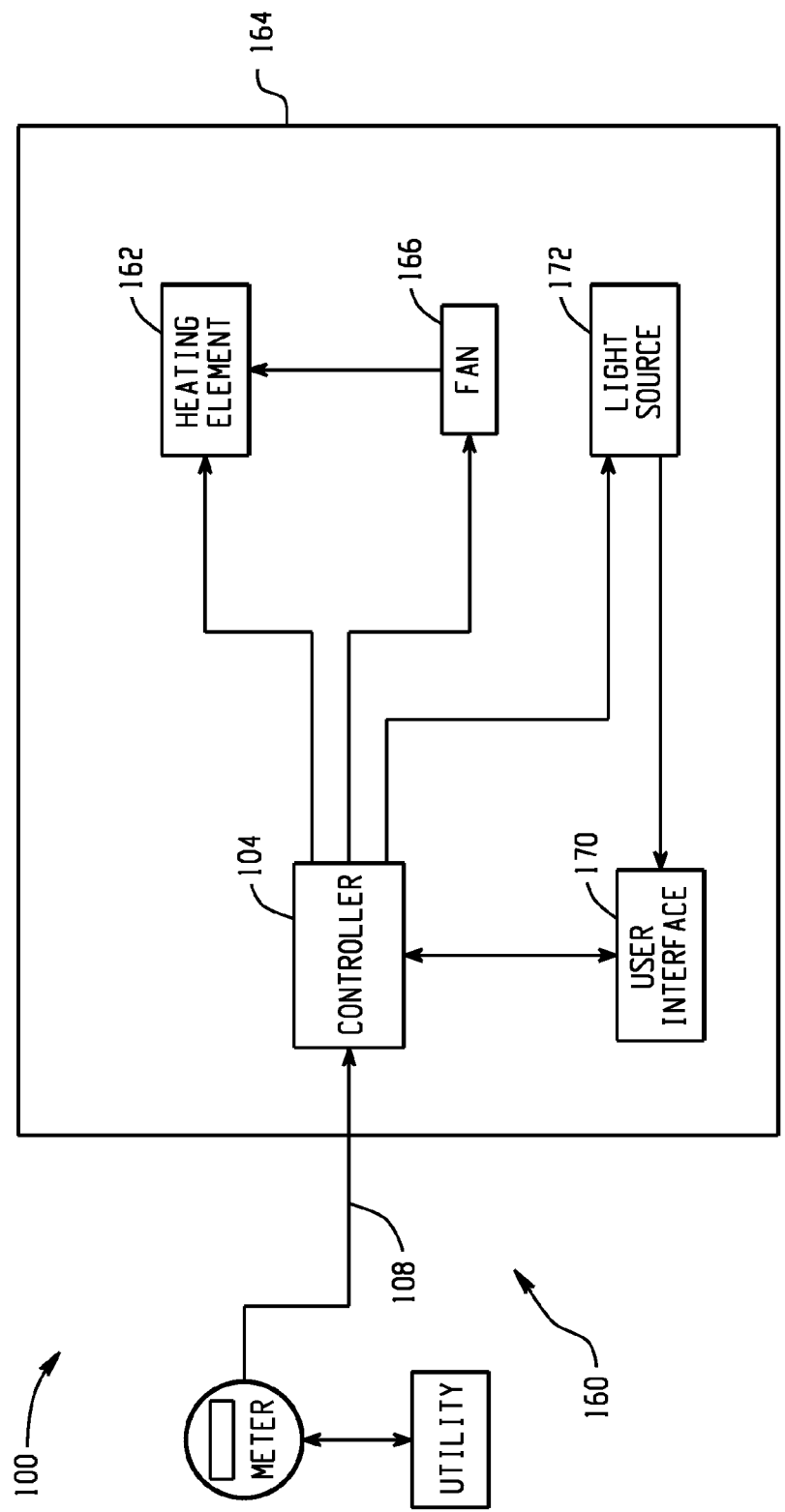
FIG. 23 is a schematic illustration of an exemplary demand managed electric heater.

Another exemplary embodiment of the appliance 100 is schematically illustrated in FIG. 23. In this embodiment, the appliance 100 is an electric heater 160 and the temperature controlling element is an electrically driven heating element 162 for heating air. With reference to FIG. 23, the electric heater comprises a housing 164 for housing the heating element 162. The heat generated by the heating element radiates through the housing to heat the air in the room. A fan 166 can be provided to direct the room air over the heating element. It should be appreciated that that alternative heating means for the electric heater are contemplated. For example, a positive temperature coefficient heater which is configured to limit temperature of the heater 160 to a maximum desired temperature can be utilized. In the energy savings mode, the controller 104 is configured to one of deactivate, adjust a setpoint temperature of vary or reduce voltage to and adjust a duty cycle of the heating element to reduce power consumption of the electric heater 160. The speed of the fan 166 can also be varied and/or reduced or the fan can be deactivated in the energy savings mode.

A control panel or user interface 170 is provided on the appliance 100 and is operatively connected to the controller 104. The control panel 170 can include a display and control buttons for making various operational selections, such as setting the setpoint temperature of temperature controlling element. A light source 172 is provided for illuminating the user interface.

If the controller 104 receives and processes an energy signal indicative of a peak demand period at any time during operation of the appliance 100, the controller makes a determination of whether one or more of the power consuming features/functions should be operated in the energy savings mode and if so, it signals the appropriate features/functions of the appliance 100 to begin operating in the energy savings mode in order to reduce the instantaneous amount of energy being consumed by the appliance. The controller 104 determines what features/functions should be operated at a lower consumption level and what that lower consumption level should be, rather than an uncontrolled immediate termination of the operation of specific features/functions.

In order to reduce the peak energy consumed by the appliance 100, the controller 104 is configured to at least one of selectively adjust and disable at least one of the one or more above described power consuming features/functions to reduce power consumption of the appliance 100 in the energy savings mode. Reducing total energy consumed also encompasses reducing the energy consumed at peak times and/or reducing the overall electricity demands. Electricity demands can be defined as average watts over a short period of time, typically 5-60 minutes. Off peak demand periods correspond to periods during which lower cost energy is being supplied by the utility relative to peak demand periods. Operational adjustments that result in functional energy savings will be described in detail hereinafter.

As set forth above, the air conditioner 110 has a setpoint temperature in the normal operating mode. To reduce the power consumption of the air conditioner 110 in the energy savings mode, the controller 104 is configured to adjust (increase or decrease) the setpoint temperature of the air conditioner 110 to precipitate less refrigeration system on time (i.e., compressor on time) in the energy savings mode. For example, if the air conditioner 110 is being used to cool the room air, the controller 104 can increase the setpoint temperature. If the air conditioner 110 includes a heat pump cycle to heat the room air, the controller 104 can decrease the setpoint temperature. To precipitate less compressor on time, according to one aspect, a duty cycle of the compressor 120 can be adjusted (for example, by time or by setpoint) in the energy savings mode. According to another aspect, to reduce the current draw of the compressor 120 in the energy savings mode, the speed and/or capacity of the compressor can be varied or reduced. A controllable expansion valve 134 can also be implemented. According to yet another aspect, the refrigeration system 112 can be temporarily deactivated in the energy savings mode. In this instance, the fan 130 can continue to operate to limit discomfort to the consumer. The light source 172 can also be dimmed or deactivated in the energy savings mode. The speed of the fan can also be varied and/or reduced or the fan can be deactivated in the energy savings mode.

Other power load reducing measures may include reducing (or increasing) before on-peak hours the setpoint temperature and increasing (or reducing) the setpoint temperature during on-peak rates. For example, just before peak rate time, the temperature setting of the air conditioner 110 could be decreased by 1-2 degrees (during off-peak rates). Some communication line with the utility including but not limited to the communication arrangements hereinbefore described could be established so that the utility can send a signal in advance to decrease the room temperature during off-peak rates as a pre-chill maneuver and, in turn, increase the setpoint temperature during on-peak rates.

The determination of which power consuming features/functions are operated in a energy savings mode may depend on whether the air conditioner 110 is currently operating in the cooling cycle or the heating cycle. In one embodiment, the controller 104 may include functionality to determine whether activation of the energy savings mode for any power consuming features/functions would potentially cause damage to any feature/function of the air conditioner 110 itself or would cause the air conditioner to fail to perform its intended function. If the controller 104 determines that an unacceptable consequence may occur by performing an energy saving action, such as deactivating or curtailing the operation of the refrigeration system 112, the controller may opt-out of performing that specific energy saving action or may institute or extend other procedures.

Figure 24:
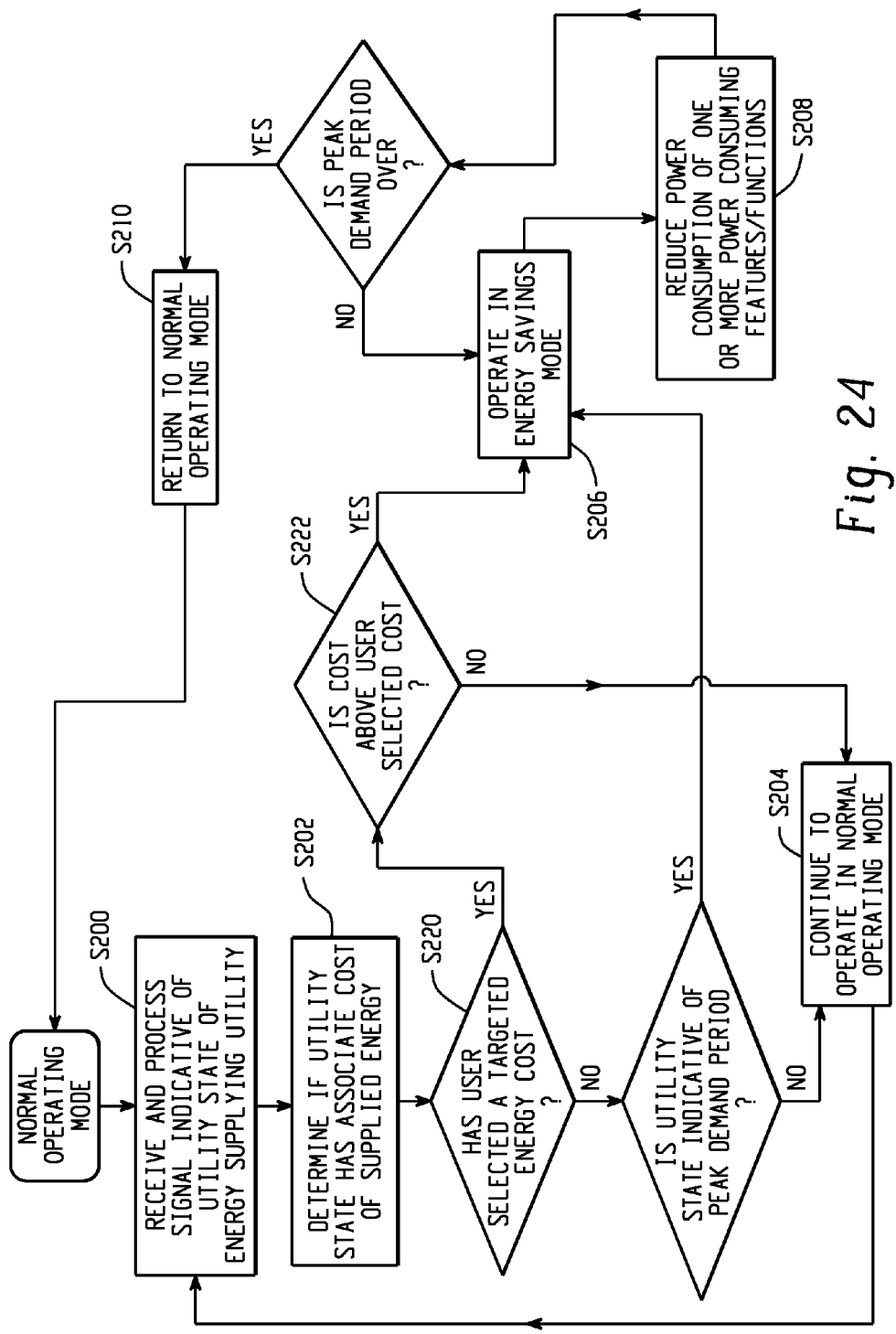
FIG. 24 is an exemplary operational flow charts for the air conditioner of FIG. 22.

With reference to FIG. 24, a control method for the appliance 100 in accordance with one aspect of the present disclosure comprises receiving and processing the signal indicative of cost of supplied energy (S200), determining a state for an associated energy supplying utility, such as a cost of supplying energy from the associated utility (S202), the utility state being indicative of at least a peak demand period or an off-peak demand period, operating the appliance 100 in a normal mode during the off-peak demand period (S204), operating the appliance in an energy savings during the peak demand period (S206), adjusting and/or selectively deactivating any number of one or more power consuming features/functions of the appliance 100 to reduce power consumption of the appliance in the energy savings mode, and returning to the normal mode after the peak demand period is over (S210). For the air conditioner 110, the control method can comprise adjusting a setpoint temperature to precipitate less refrigeration system on time in the energy savings mode. The control method can further comprise adjusting a duty cycle or variable speed of the compressor 120 and/or deactivating the refrigeration system 112 altogether.

As yet another method to reduce power consumption of the air conditioner in the energy savings mode, the sensing device 150 is operatively connected to the controller 104 and is configured to measure the outdoor temperature and/or humidity and the indoor air temperature and/or setpoint temperature. The control method compares the measured temperature and/or humidity of outdoor air to the setpoint and/or indoor temperatures to determine whether to open the damper 152 and allow cooler and low humid outdoor air to circulate into the room. The refrigeration system 112 can be deactivated during this cooling operating condition.

As indicated previously, the control panel or user interface 170 can include a display and control buttons for making various operational selections. The display can be configured to provide active, real-time feedback to the user on the cost of operating the appliance 100. The costs associated with using the appliance 100 are generally based on the current operating and usage patterns and energy consumption costs, such as the cost per kilowatt hour charged by the corresponding utility. The controller 104 is configured to gather information and data related to current usage patterns and as well as current power costs. This information can be used to determine current energy usage and cost associated with using the appliance 100 in one of the energy savings mode and normal mode. This real-time information (i.e., current usage patterns, current power cost and current energy usage/cost) can be presented to the user via the display.

It is to be appreciated that a manual or selectable override can be provided on the user interface 170 providing a user the ability to select which of the one or more power consuming features/functions are delayed, adjusted and/or disabled by the controller in the energy savings mode. The user can override any adjustments, whether time related or function related, to any of the power consuming functions. Further, the user can override the current operating mode of the appliance 100. Particularly, as shown in FIG. 24, if the utility state has an associated energy cost, the user can base operation of the appliance on a user selected targeted energy cost, such a selected pricing tier or cost per kilowatt hour charged by the corresponding utility (S220). If the current cost exceeds the user selected cost, the controller 104 will operate the appliance 100 in the energy savings mode (S222 and S206). If the current cost is less than the user selected cost, the controller 104 will operate the appliance 100 in the normal mode (S204). This operation based on a user selected targeted energy cost is regardless of the current energy cost being indicative of one of a peak demand period and an off-peak demand period.

The operational adjustments, particularly an energy savings operation can be accompanied by a display on the control panel which communicates activation of the energy savings mode. The energy savings mode display can include a display of "ECO", "Eco", "EP", "ER", "CP", "CPP", "DR", or "PP" on the appliance display panel in cases where the display is limited to three characters. In cases with displays having additional characters available, messaging can be enhanced accordingly. Additionally, an audible signal can be provided to alert the user of the appliance operating in the energy savings mode.

The duration of time that the appliance 100 operates in the energy savings mode may be determined by information in the energy signal. For example, the energy signal may inform the controller 104 to operate in the energy savings mode for a few minutes or for one hour, at which time the appliance 100 returns to normal operation. Alternatively, the energy signal may be continuously transmitted by the utility provider, or other signal generating system, as long as it is determined that instantaneous load reduction is necessary. Once transmission of the signal has ceased, the appliance 100 returns to normal operating mode. In yet another embodiment, an energy signal may be transmitted to the controller 104 to signal the appliance 100 to operate in the energy savings mode. A normal operation signal may then be later transmitted to the appliance to signal the appliance to return to the normal operating mode.

The operation of the appliance 100 may vary as a function of a characteristic of the utility state and/or supplied energy, e.g., availability and/or price. Because some energy suppliers offer what is known as time-of-day pricing in their tariffs, price points could be tied directly to the tariff structure for the energy supplier. If real time pricing is offered by the energy supplier serving the site, this variance could be utilized to generate savings and reduce chain demand. Another load management program offered by energy supplier utilizes price tiers which the utility manages dynamically to reflect the total cost of energy delivery to its customers. These tiers provide the customer a relative indicator of the price of energy and are usually defined as being LOW, MEDIUM, HIGH and CRITICAL. The controller 104 is configured to operate the appliance in an operating mode corresponding to one of the price tiers. For example, the controller is configured to operate the appliance 100 in the normal operating mode during each of the low and medium price tier and is configured to operate the appliance in the energy savings mode during each of the high and critical price tier. If the utility offers more than two rate/cost conditions, different combinations of energy saving control steps may be programmed to provide satisfactory cost savings/performance tradeoff.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. An air conditioner control method, comprising:
   determining a state for an associated energy supplying utility, the utility state being indicative of at least a peak demand period or an off-peak demand period;
   operating the air conditioner in a normal mode during the off-peak demand period;
   operating the air conditioner in an energy savings mode during the peak demand period;
   selectively adjusting and/or deactivating any number of one or more power consuming features/functions of the air conditioner to reduce power consumption of the air conditioner in the energy savings mode, including adjusting a setpoint temperature to precipitate less refrigeration system on time in the energy savings mode; and
   returning to the normal mode after the peak demand period is over;
   the steps of determining the state for an associated energy supplying utility and operating the air conditioner in the normal mode and the energy savings mode being carried out via an interface module connectable to a controller of the air conditioner and to the energy supplying utility, the interface module being configurable to match communication protocols of various utilities and enabling the air conditioner to be matched to the communication requirements of various utilities, the interface module mounting either integrally with or externally to the air conditioner.

2. The method of claim 1, further comprising adjusting one of a duty cycle and speed of a compressor of the refrigeration system in the energy savings mode.

3. The method of claim 1, further comprising deactivating the refrigeration system in the energy savings mode.

4. The method of claim 1, further comprising:
   measuring one of temperature and humidity of outdoor air,
   measuring indoor air temperature,
   comparing one of the measured temperature and humidity to one of the setpoint temperature and indoor air temperature,
   deactivating or reducing power of the refrigeration system during a cooling operating condition if one of the measured temperature and humidity is approximately equal to one of the setpoint temperature and indoor air temperature, and
   selectively drawing in outdoor air into an associated room.

5. The method of claim 1, wherein the one or more power consuming features/functions further includes a light source for illuminating a user interface, and further comprising disabling the light source in the energy savings mode.

6. The method of claim 1, further comprising:
   determining the energy cost associated with the utility demand;
   displaying current cost of operating the air conditioner,
   displaying current cost of supplied energy, and
   alerting a user of a peak demand period.

* * * * *

UNITED STATES PATENT AND TRADEMARK OFFICE
CERTIFICATE OF CORRECTION

| | | |
|---|---|---|
| PATENT NO. | : 8,793,021 B2 | Page 1 of 1 |
| APPLICATION NO. | : 12/559539 | |
| DATED | : July 29, 2014 | |
| INVENTOR(S) | : Watson et al. | |

It is certified that error appears in the above-identified patent and that said Letters Patent is hereby corrected as shown below:

In the Drawings

Figure 19:
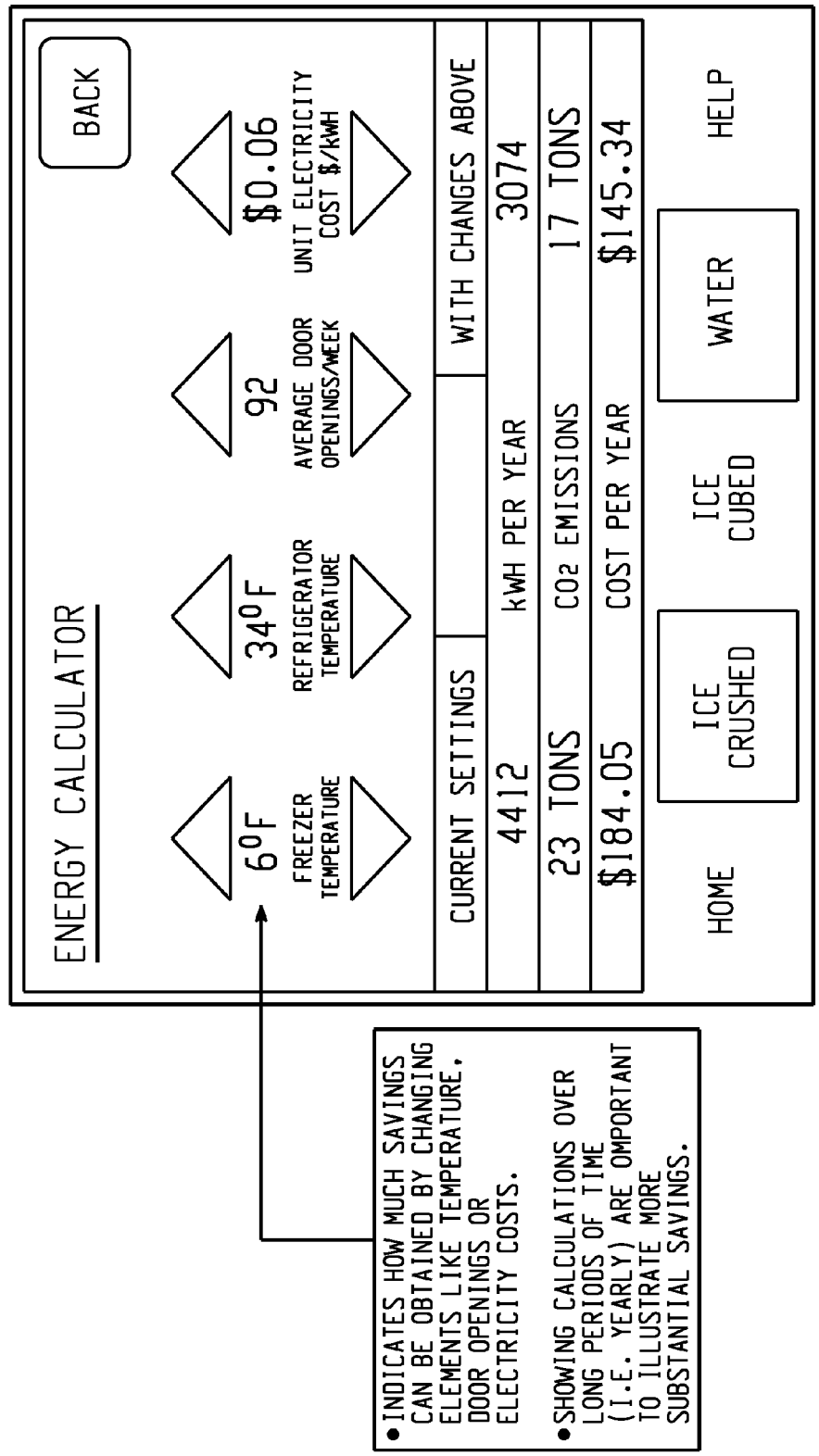

In Fig. 19, Sheet 19 of 24, delete "OMPORTANT" and insert -- IMPORTANT --, therefor.

In Fig. 21, Sheet 21 of 24, delete "PEFORMANCE IS WOULD" and insert -- PERFORMANCE WOULD --, therefor.

In the Specification

In Column 5, Line 40, delete "DSSM" and insert -- DSMM --, therefor.

In Column 12, Line 19, delete "of vary" and insert -- of, vary --, therefor.

Signed and Sealed this
Twenty-eighth Day of April, 2015

Michelle K. Lee
*Director of the United States Patent and Trademark Office*